US012743973B2

(12) United States Patent
Yasu

(10) Patent No.: US 12,743,973 B2
(45) Date of Patent: Sep. 22, 2026

(54) PIN DISPLAY APPARATUS, PIN DISPLAY SYSTEM

(71) Applicant: NTT, Inc., Tokyo (JP)

(72) Inventor: Kentaro Yasu, Tokyo (JP)

(73) Assignee: NTT, Inc., Tokyo (JP)

( * ) Notice: Subject to any disclaimer, the term of this patent is extended or adjusted under 35 U.S.C. 154(b) by 224 days.

(21) Appl. No.: 18/832,705

(22) PCT Filed: Feb. 21, 2022

(86) PCT No.: PCT/JP2022/006910
§ 371 (c)(1),
(2) Date: Jul. 24, 2024

(87) PCT Pub. No.: WO2023/157287
PCT Pub. Date: Aug. 24, 2023

(65) Prior Publication Data

US 2025/0095518 A1 Mar. 20, 2025

(51) Int. Cl.
*G09F 9/37* (2006.01)

(52) U.S. Cl.
CPC .................................... *G09F 9/375* (2013.01)

(58) Field of Classification Search
CPC ................................... G09F 9/375; G09F 9/37
See application file for complete search history.

(56) References Cited

U.S. PATENT DOCUMENTS 4,654,989 A * 4/1987 Fleming .................... G09F 7/02 40/579
5,717,423 A * 2/1998 Parker ..................... G06F 3/016 434/114
6,189,246 B1 * 2/2001 Gorthala ................... G09F 9/37 40/446
6,462,840 B1 * 10/2002 Kravtsov ................. H04N 1/04 348/E13.059
6,625,088 B1 * 9/2003 Mah ........................ G09F 9/375 368/230
8,573,979 B2 * 11/2013 Skinner ................ G09B 21/003 434/114
8,998,652 B2 * 4/2015 Martineau ............... G06F 3/016 324/755.05
10,748,460 B1 * 8/2020 Siegel ...................... G09F 19/02
11,367,368 B2 * 6/2022 Simmons ............... G02B 30/54

(Continued)

OTHER PUBLICATIONS

Zarate et al. (2017) "Using Pot-Magnets to Enable Stable and Scalable Electromagnetic Tactile Displays", IEEE Transactions on Haptics, vol. 10, No. 1, pp. 106-112.

*Primary Examiner* — Gary C Hoge

(57) ABSTRACT

One aspect of the present invention is a pin display device 100 including a housing and a plurality of pins, the pin display device 100 being used as a pin display system 300 such that a direction in which at least gravity acts is set as a negative direction of a z direction, and a lower surface of the housing is brought into contact with or into proximity to an upper surface 200*a* that is one surface of a magnetic sheet 200. Each pot magnet emits a magnetic field capable of moving a pin 120 including the pot magnet in a positive direction of the z direction by a repulsive force due to a magnetic force generated between the pot magnet and the upper surface 200*a* of the magnetic sheet 200 in a state where the pin 120 including the pot magnet is inserted into a pin insertion hole.

8 Claims, 16 Drawing Sheets

(56) References Cited

U.S. PATENT DOCUMENTS

| | | | | |
|---|---|---|---|---|
| 11,710,427 | B2 * | 7/2023 | Bitton | G09F 9/37 40/431 |
| 2005/0151761 | A1 * | 7/2005 | Hillis | G09F 9/372 345/905 |
| 2005/0231309 | A1 * | 10/2005 | Lee | B43L 1/008 335/78 |
| 2006/0044256 | A1 * | 3/2006 | Carlberg | G09F 19/02 345/108 |
| 2008/0301986 | A1 * | 12/2008 | Quin | G09F 19/14 40/446 |
| 2015/0124475 | A1 * | 5/2015 | Suhr | A63C 19/00 362/555 |
| 2015/0248960 | A1 * | 9/2015 | Khan | H01F 7/064 361/143 |
| 2018/0174487 | A1 * | 6/2018 | Chen | G06F 3/01 |
| 2021/0012689 | A1 * | 1/2021 | Simmons | G02B 30/54 |
| 2021/0280100 | A1 * | 9/2021 | Bitton | G09F 9/37 |

* cited by examiner

PIN DISPLAY APPARATUS, PIN DISPLAY SYSTEM

CROSS-REFERENCE TO RELATED APPLICATIONS

This application is a U.S. 371 Application of International Patent Application No. PCT/JP2022/006910, filed on 21 Feb. 2022, the disclosure of which is hereby incorporated herein by reference in its entirety.

TECHNICAL FIELD

The present invention relates to a pin display.

BACKGROUND ART

Assuming that each axis in three dimensions is an x axis, a y axis, and a z axis, a conventionally known pin display includes a plurality of pins arranged such that an axial direction of each pin is a z direction and a set of an x coordinate value and a y coordinate value of the axis is different for each pin, in a non-display state, one end (hereinafter, referred to as "upper end") of all the pins is located on a plane of the same z coordinate value, by applying a force acting in the z direction to a desired pin, the desired pin is moved in the z direction, and information is displayed by a three-dimensional point group formed by the upper ends of the plurality of pins.

Non Patent Literature 1 discloses a pin display device in which a magnet is attached to a lower end of each pin, and an electromagnet disposed in proximity to each magnet generates a magnetic field to move the pin using an attractive force or a repulsive force of the magnet.

CITATION LIST

Non Patent Literature

Non Patent Literature 1: J. J. Zarate and H. Shea, "Using Pot-Magnets to Enable Stable and Scalable Electromagnetic Tactile Displays", IEEE Transactions on Haptics VOL. 10, NO. 1 (2017), pp. 106-112

SUMMARY OF INVENTION

Technical Problem

With the pin display device of Non Patent Literature 1, arbitrary display can be performed by moving the pin using attractive force or repulsive force. However, in order to perform display with the pin display device of Non Patent Literature 1, it is necessary to drive each electromagnet corresponding to each pin by electrical control. Although various pin displays are known in addition to Non Patent Literature 1, pins are moved by electrical control in pin displays other than Non Patent Literature 1. That is, the conventional technique of the pin display has a problem that an electrical control mechanism accompanied by a power supply and wiring is required.

An object of the present invention is to provide a pin display that does not require an electrical control mechanism accompanied by a power supply and wiring.

Solution to Problem

One aspect of the present invention is a pin display device including a housing and a plurality of pins, the pin display device being used as a pin display system such that a direction in which at least gravity acts is set as a negative direction of a z direction, and a lower surface of the housing is brought into contact with or into proximity to an upper surface that is one surface of a magnetic sheet, in which the housing includes the lower surface of the housing that is a plane perpendicular to the z direction, an upper surface of the housing that is in a positive direction of the z direction with respect to the lower surface of the housing, and a same number of pin insertion holes as the pins, each of the pin insertion holes is a hole into which the pin is inserted from the upper surface of the housing, the same number of pin insertion holes as the pins have different positions in a plane perpendicular to the z direction, a material of the housing is a material that does not block or reduce a magnetic force line, does not control a path of a magnetic force line, and does not generate a magnetic force line, each of the pins is provided at one end with a pot magnet with an opening of a container facing outward, and is inserted into the pin insertion hole with the end provided with the pot magnet facing the negative direction of the z direction, each of the pot magnets emits a magnetic field capable of moving the pin including the pot magnet in the positive direction of the z direction by a repulsive force due to a magnetic force generated between the pot magnet and the upper surface of the magnetic sheet in a state where the pin including the pot magnet is inserted into the pin insertion hole, an interval between adjacent pin insertion holes is equal to or greater than a shortest distance at which a magnetic force generated with respect to the pot magnet of the pin inserted into the adjacent pin insertion hole does not affect movement of the pins, and a gap having a length in the z direction equal to or greater than a shortest distance in which at which rewriting of a magnetic sheet of a same type as the magnetic sheet does not occur due to a magnetic field emitted by a pot magnet that emits a same magnetic field as the pot magnet is provided between a bottom of the pin insertion hole and the lower surface of the housing.

One aspect of the present invention is a pin display system including the above-described pin display device and a magnetic sheet having one surface disposed in contact with or in proximity to a lower surface of a housing of the pin display device.

Advantageous Effects of Invention

According to the present invention, it is possible to provide a pin display that does not require an electrical control mechanism accompanied by a power supply and wiring.

DESCRIPTION OF EMBODIMENTS

First Embodiment

Figure 1:
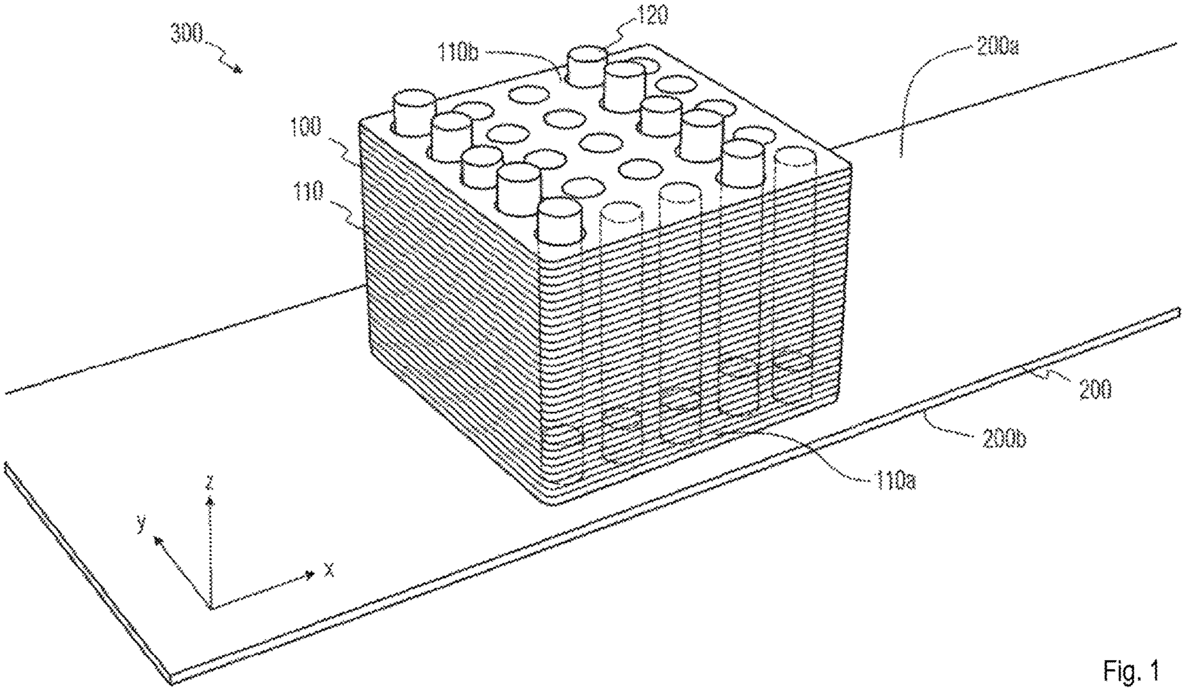
FIG. 1 is a perspective diagram illustrating a pin display system 300.
Figure 2:
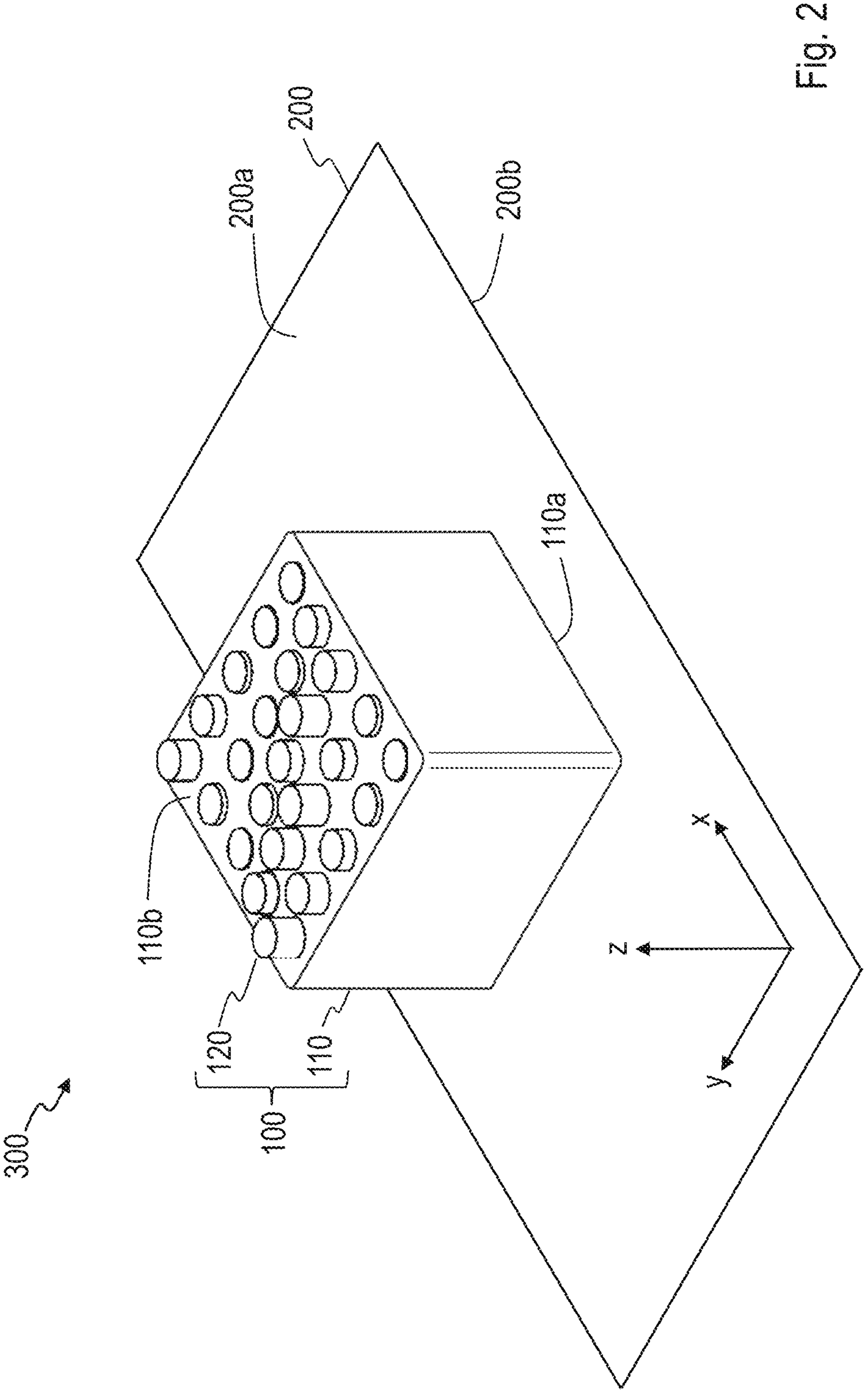
FIG. 2 is a perspective diagram illustrating the pin display system 300.
Figure 3:
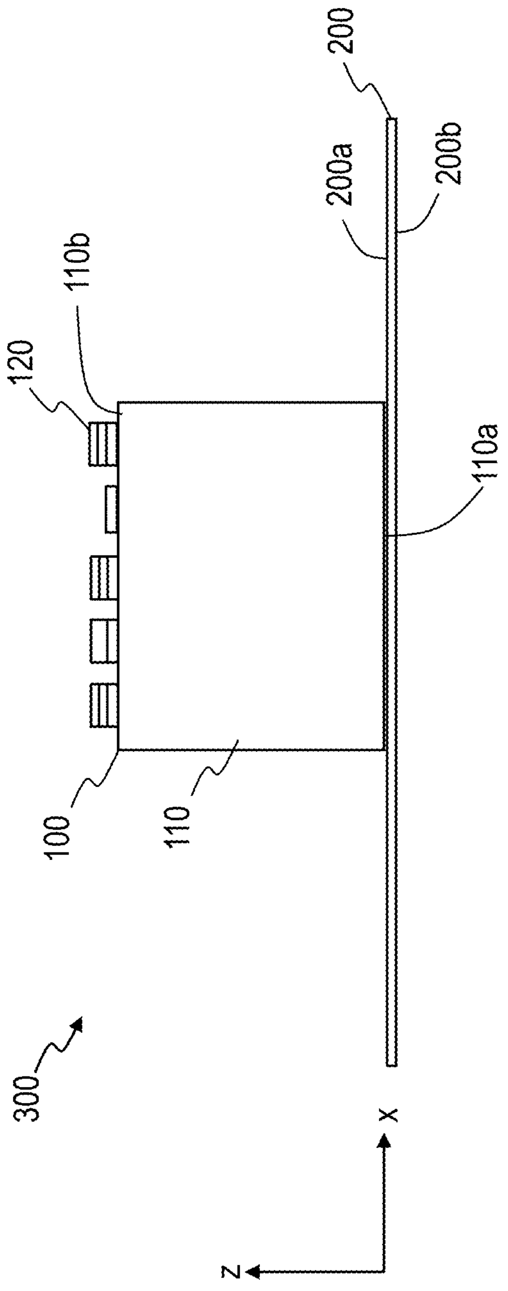
FIG. 3 is a side diagram illustrating the pin display system 300.

In a first embodiment, an example of a pin display system of the present invention will be described. As illustrated in FIGS. 1 to 3, the pin display system 300 of the first embodiment includes the pin display device 100 and the magnetic sheet 200. The pin display device 100 of the first embodiment includes the housing 110 and 25 pins 120. Hereinafter, each axis orthogonal in a three-dimensional space will be described as an x axis, a y axis, and a z axis illustrated in FIGS. 1 and 2. The pin display device 100 and the magnetic sheet 200 are disposed such that a lower surface 110*a* of the housing 110 of the pin display device 100 and an upper surface 200*a* of the magnetic sheet 200 are in contact with or in proximity to each other. That is, the pin display device 100 is used as the pin display system 300 by bringing the lower surface 110*a* of the housing 110 into contact with or into proximity to the upper surface 200*a* of the magnetic sheet 200. The upper surface 200*a* of the magnetic sheet 200 is one of two surfaces of the magnetic sheet 200. "Proximity" refers to a situation in which the pin display device 100 is affected by the magnetic field of the magnetic sheet 200 although the lower surface 110*a* of the housing 110 of the pin display device 100 and the upper surface 200*a* of the magnetic sheet 200 are not in contact with each other, but almost in the same manner as in a case where the lower surface 110*a* of the housing 110 of the pin display device 100 and the upper surface 200*a* of the magnetic sheet 200 are in contact with each other, such as a case where a thin film-shaped object such as paper or cloth is placed on the upper surface 200*a* of the magnetic sheet 200 and the lower surface 110*a* of the housing 110 of the pin display device 100 is placed on the thin film-shaped object in contact with the thin film-shaped object. Note that although the pin display device 100 of the first embodiment includes the 25 pins 120, only one pin 120 included in the pin display device 100 is denoted by a reference numeral in consideration of the visibility of each drawing. The same applies to reference numerals of a plurality of pins, a plurality of pin insertion holes, each part of the pin and the pin insertion hole, and the like in the drawings to be described below. Since the pin display system 300 uses gravity to move the pin 120 in the negative direction of the z direction (that is, the direction opposite to the direction indicated by the arrow indicating the z direction in FIGS. 1 to 3), the direction of gravity is favorably used as the negative direction of the z direction. That is, the pin display system 300 is favorably configured such that the x axis and the y axis are two orthogonal axes in a horizontal plane. However, it is sufficient if the pin display system 300 uses the direction in which at least gravity acts as the negative direction of the z direction. That is, even when the x axis and the y axis are two orthogonal axes in a plane slightly inclined with respect to the horizontal plane, the pin display system 300 can be used.

<Housing 110>

Figure 4:
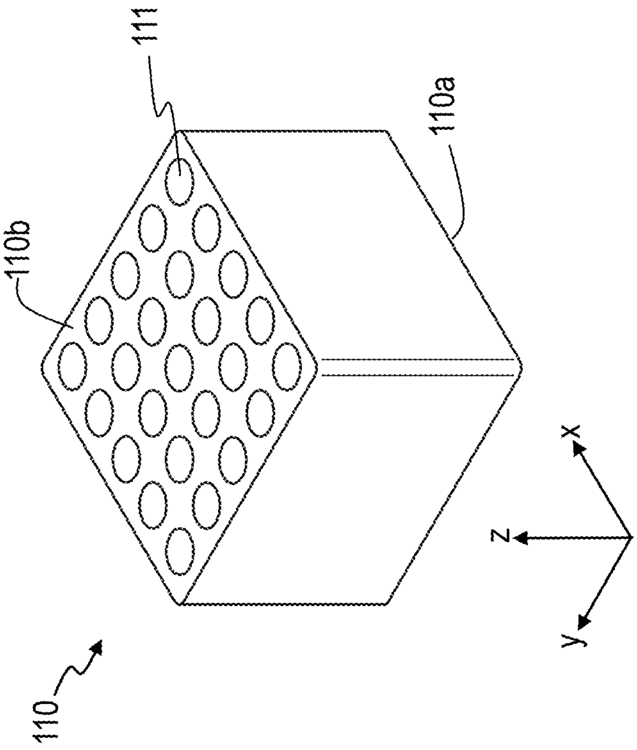
FIG. 4 is a perspective diagram illustrating a housing 110 of a pin display device 100.
Figure 5:
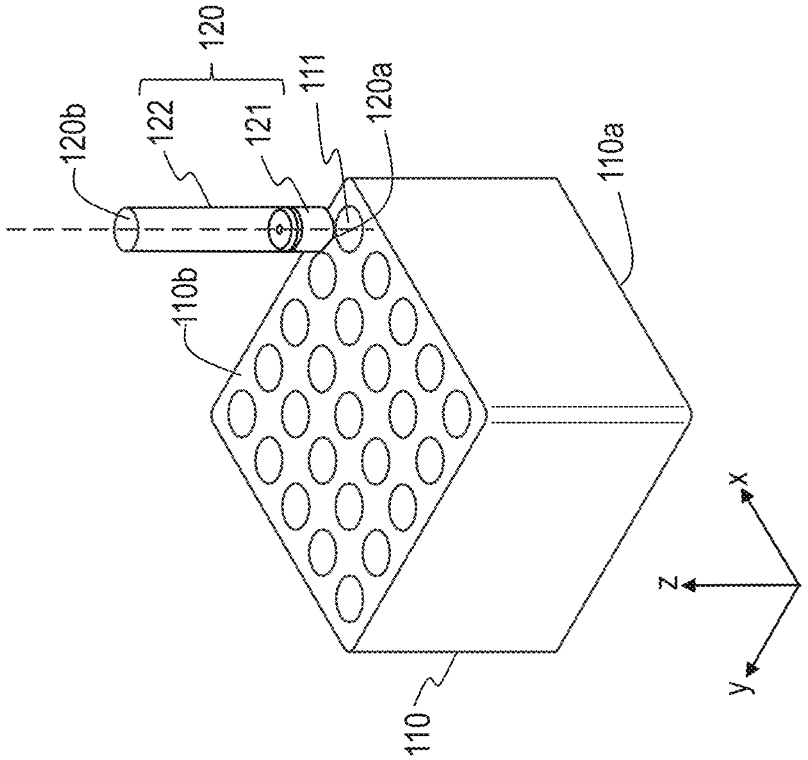
FIG. 5 is a perspective diagram illustrating the housing 110 of the pin display device 100, one pin 120 of the pin display device 100, and a state in which the pin 120 is inserted into the housing 110.
Figure 7:
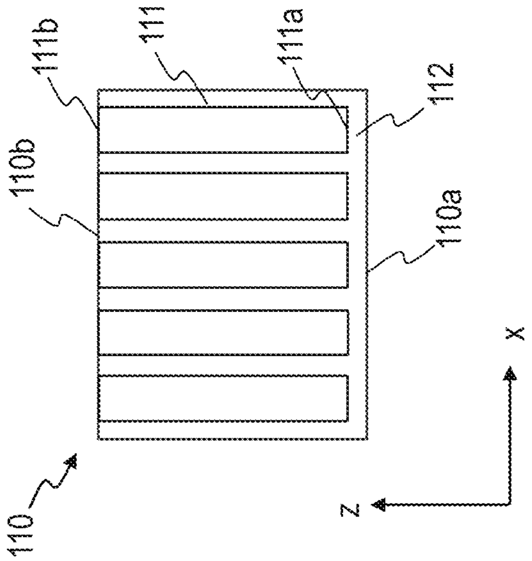
FIG. 7 is a cross-sectional diagram illustrating the housing 110 of the pin display device 100.

As illustrated in FIG. 4, the housing 110 has a substantially rectangular parallelepiped outer shape including the lower surface 110*a* that is a plane perpendicular to the z direction and an upper surface 110*b* that is a plane in the positive direction of the z direction with respect to the lower surface 110*a* and parallel to the lower surface 110*a*, and includes 25 pin insertion holes 111. As illustrated in FIG. 5, each of the pin insertion holes 111 is a hole into which the pin 120 is inserted from the upper surface 110*b* side, is a hole for allowing the pin 120 having a substantially columnar shape to move in the z direction, and has a substantially columnar shape with the central axis in the z direction. As illustrated in FIG. 7, two parallel substantially circular bottom surfaces of each of the pin insertion holes 111 having a substantially columnar shape are an upper surface 111*b* in the upper surface 110*b* of the housing 110 and a lower surface 111*a* that is a plane in the negative direction of the z direction with respect to the upper surface 111*b* having a columnar shape and perpendicular to the z direction. The 25 pin insertion holes 111 have different positions in a plane perpendicular to the z direction, and specifically, the 25 pin insertion holes 111 are disposed in a 5×5 matrix of 5 at equal intervals in the x direction and 5 at equal intervals in the y direction. The material of the housing 110 is a material, such as plastic, resin, or paper, which does not block or reduce a magnetic force line, does not control the path of a magnetic force line, and does not generate a magnetic force line. The diameter of the substantially columnar shape of each of the pin insertion holes 111 is set in advance by an experiment or the like as a value slightly larger than the diameter of the substantially columnar shape of the pin 120 so that the pin 120 having a substantially columnar shape hardly moves in the x direction or the y direction although the pin 120 having a substantially columnar shape can easily move in both the positive direction and the negative direction of the z direction.

<Pin 120>

As illustrated in FIG. 5, each pin 120 is inserted into each pin insertion hole 111 of the housing 110, and has an outer shape having a substantially columnar shape in which one end is a lower surface 120*a* having a substantially circular shape and the other end is an upper surface 120*b* that is a plane parallel to the lower surface 110*a*. In each pin 120, a pot magnet 121 is provided at one end with an opening of the container (pot) facing outward, and an end provided with the pot magnet 121 faces the negative direction of the z direction and is inserted into each pin insertion hole 111 of the housing 110.

Figure 6B:
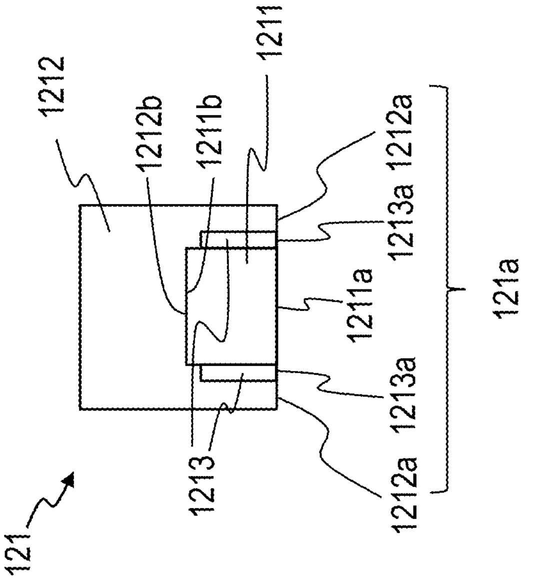
FIG. 6B is a cross-sectional diagram illustrating the pot magnet 121.
Figure 6C:
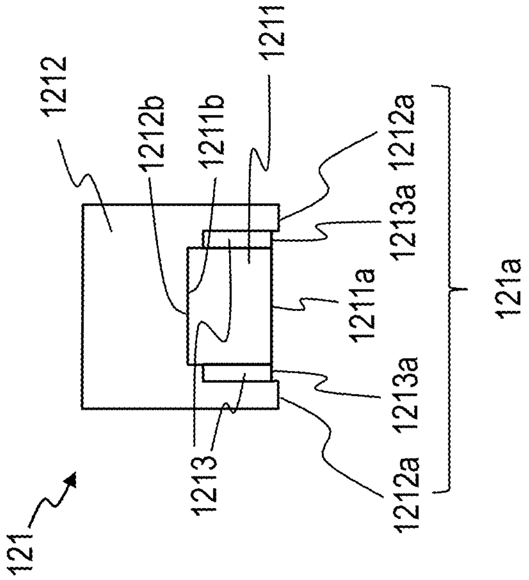
FIG. 6C is a cross-sectional diagram illustrating another example of the pot magnet 121.
Figure 6A:
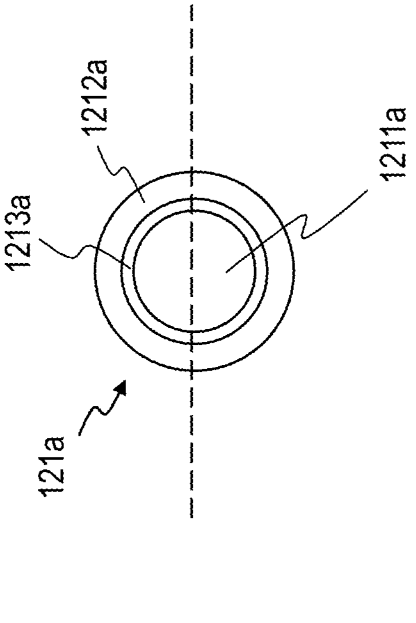
FIG. 6A is a diagram illustrating a lower surface 121*a* of a pot magnet 121.

As the bottom diagram is illustrated in FIG. 6A and as the cross-sectional diagram cut along the broken line in FIG. 6A is illustrated in FIG. 6B, the pot magnet 121 is obtained by fixing a permanent magnet 1211 to the inside of a container 1212 of a material having high magnetic permeability and having an opening 1212*a* on one surface, one pole 1211*b* of the permanent magnet 1211 is in contact with a contact surface 1212*b* on the inside of the container 1212, and the other pole 1211*a* of the permanent magnet 1211 is exposed from the opening 1212*a* of the container 1212 on the lower surface 121*a* of the pot magnet 121. Examples of the material having high magnetic permeability include iron and stainless steel. A low-permeability layer 1213, which is a layer of a material having a low magnetic permeability, is provided between the portion of the permanent magnet 1211 that is not a pole and the container 1212 in order to prevent the portion of the permanent magnet 1211 that is not a pole from coming into contact with the container 1212 and short-circuiting magnetic force lines. Examples of the material having low magnetic permeability include resin, paper, and air. For fixing the permanent magnet 1211 to the container 1212, an attractive force generated between the pole 1211*b* of the permanent magnet 1211 and the contact surface 1212*b* of the container 1212 may be used, or an adhesive may be used. In general, the permanent magnet 1211 and the container 1212 are often bonded using an adhesive having a strong adhesive force so as not to be easily separated.

The lower surface 121*a* of the pot magnet 121 is formed by the pole 1211*a* of the permanent magnet 1211, the opening 1212*a* of the container 1212 surrounding the pole 1211*a* of the permanent magnet 1211, and a lower surface 1213*a* of the low-permeability layer 1213 between the pole 1211*a* of the permanent magnet 1211 and the opening 1212*a* of the container 1212. However, since the low-permeability layer 1213 may be an air layer as described above, the lower surface 1213*a* of the low-permeability layer 1213 may be invisible in some cases. That is, the lower surface 121*a* of the pot magnet 121 may be formed by the pole 1211*a* of the permanent magnet 1211 and the opening 1212*a* of the container 1212 surrounding the pole 1211*a* without contact with the pole 1211*a*. On the lower surface 121*a* of the pot magnet 121, the pole 1211*a* of the permanent magnet 1211 and the opening 1212*a* of the container 1212 may be on the same plane as illustrated in FIG. 6B, but may not be on the same plane, and as illustrated in FIG. 6C, the pole 1211*a* of the permanent magnet 1211 may be located slightly inward of the container 1212 with respect to the opening 1212*a* of the container 1212. For example, the pole 1211*a* of the permanent magnet 1211 may be located inward of the container 1212 about 0.2 mm to 0.4 mm with respect to the opening 1212*a* of the container 1212. Note that when the lower surface 1213*a* of the low-permeability layer 1213 is positively present, the lower surface 1213*a* of the low-permeability layer 1213 is in the same plane as the opening 1212*a* of the container 1212 or is inward of the container 1212 with respect to the opening 1212*a* of the container 1212.

Hereinafter, in order to simplify the description, an example in which the pole 1211*a* of the permanent magnet 1211, the opening 1212*a* of the container 1212, and the lower surface 1213*a* of the low-permeability layer 1213 are on the same plane as illustrated in FIG. 6B, that is, an example in which the lower surface 121*a* of the pot magnet 121 is a circular plane, that is, an example in which the lower surface 120*a* of the pin 120 is a plane and the pin 120 has a columnar shape will be described, except for the case where explicit description is given.

The material and shape of the container 1212 of the pot magnet 121 included in all the pins 120 are the same. In addition, the material, shape, and strength of the permanent magnet 1211 of the pot magnet 121 included in all the pins 120 are the same. The poles 1211*a* of the permanent magnets 1211 of the pot magnets 121 included in all the pins 120 are the same poles (for example, N pole). In each pot magnet 121, the lower surface 121*a* of the pot magnet 121 is provided on the lower surface 120*a* of each pin 120 so as to face outward. That is, each pot magnet 121 is provided on the lower surface 120*a* of each pin 120 such that the lower surface 121*a* of the pot magnet 121 is on the lower surface 120*a* side of the pin 120. For example, it is sufficient if each pin 120 is configured such that the lower surface 121*a* which is a circular plane of each pot magnet 121 becomes the lower surface 120*a* which is one circular plane of the pin 120. The lower surface 120*a* of each pin 120 is in contact with the lower surface 111*a* of each pin insertion hole 111 of the housing 110 by gravity in a state where the effect of the external magnetic field is negligibly small. Then, when the lower surface 110*a* of the housing 110 and the upper surface 200*a* of the magnetic sheet 200 come into contact with or into proximity to each other, in a case where there is a repulsive force due to the magnetic force generated between each pot magnet 121 of each pin 120 and the upper surface 200*a* of the magnetic sheet 200, each pin 120 moves in the positive direction (that is, the direction including at least a direction opposite to gravity) of the z direction by the repulsive force. For this reason, each pot magnet 121 included in each pin 120 needs to emit a magnetic field capable of moving each pin 120 in the positive direction of the z direction by the repulsive force due to the magnetic force generated with respect to the upper surface 200*a* of the magnetic sheet 200.

The length (that is, the height of the columnar shape of each pin 120) of each pin 120 is the same as the depth (that is, the height of the columnar shape of each pin insertion hole 111) of each pin insertion hole 111 or longer than the depth (length) of each pin insertion hole 111. The upper surface 120*b* of each pin 120 is located at the same z coordinate position as the upper surface 111*b* of the pin insertion hole 111 or at a position having a predetermined z coordinate in the positive direction with respect to the upper surface 111*b* of the pin insertion hole 111 in a state where the opposite direction of the z direction is the direction in which at least the gravity acts and the effect of the external magnetic field is negligibly small. That is, in a state where the opposite direction of the z direction is the direction in which at least the gravity acts and the effect of the external magnetic field is negligibly small, the upper surfaces 120*b* of all the pins 120 are at the same height as the upper surface 110*b* of the housing 110 or the upper surfaces 120*b* of all the pins 120 are at a certain predetermined height higher than the upper surface 110*b* of the housing 110. A plane formed by the upper surfaces 120*b* of all the pins 120 in a state where the effect of the external magnetic field is negligibly small corresponds to a state where the pin display device 100 displays nothing. Note that since the pin display device 100 displays information by a three-dimensional point group formed by the upper surfaces 120*b* of all the pins 120, it is not essential that the upper surface 120*b* of each pin 120 is a plane, and for example, the upper surface 120*b* of each pin 120 may include an open portion.

Each pin 120 moves in the positive direction of the z direction by the repulsive force due to the magnetic force generated between each pot magnet 121 and the upper surface 200*a* of the magnetic sheet 200. In order to give more variations to the display by the pin display device 100, the maximum value of the movable amount of each pin 120 in the z direction is favorably larger. However, when the maximum value of the movable amount of each pin 120 in the z direction is larger than the depth (that is, the height of the columnar shape of each pin insertion hole 111) of each pin insertion hole 111, the pin 120 pops out of the pin insertion hole 111 when the moving amount of the pin 120 in the z direction becomes the maximum value. Accordingly, the depth of each pin insertion hole 111 needs to be a value larger than the maximum value of the movable amount of each pin 120 in the z direction, and the length of each pin 120 needs to be a value larger than the maximum value of the movable amount of each pin 120 in the z direction.

However, when a commercially available general pot magnet is used for each pot magnet 121 of each pin 120, the length of each pin 120 cannot be often set to a value larger than the maximum value of the movable amount of each pin 120. In such a case, each pin 120 favorably includes a spacer 122 which is a portion other than the pot magnet 121. Each spacer 122 favorably does not block or reduce a magnetic force line, does not control the path of a magnetic force line, does not generate a magnetic force line, and is as light as possible so as not to prevent the movement of each pin 120 in the positive direction of the z direction by the repulsive force due to the magnetic force generated between each pot magnet 121 and the magnetic sheet 200 as much as possible, and for example, each spacer is favorably made of plastic or paper including many hollow portions like a straw.

<Relationship Between Strength and Interval of Pot Magnet 121>

The pin display device 100 displays information by a three-dimensional point group formed by the upper surfaces 120*b* of all the pins 120 included in the pin display device 100 by moving a desired pin 120 among all the pins 120 included in the pin display device 100 in the positive direction of the z direction by the repulsive force due to the magnetic force generated between the pot magnet 121 included in the pin 120 and the magnetic sheet 200. In order to increase the displayable range in the z direction by the pin display device 100, it is sufficient if the movable range in the z direction by the pin display device 100 is increased, and the magnetic field emitted by the pot magnet 121 of each pin 120 included in the pin display device 100 is favorably strong. However, when the magnetic field emitted by the pot magnet 121 is made too strong, the magnetic force generated with respect to the pot magnet 121 included in an adjacent pin 120 affects the movement of the adjacent pins 120. Therefore, it is necessary to increase the interval between the adjacent pins 120 so that the magnetic field emitted by the pot magnet 121 does not affect the movement of another pin 120. However, when the interval between the adjacent pins 120 is increased, the resolution of the display in the x direction and the y direction of the display on the pin display device decreases. Accordingly, the interval between the adjacent pins 120 and the strength of the magnetic field emitted by the pot magnet 121 included in each pin 120 need to be determined in consideration of the resolution of the display in the x direction and the y direction of the display on the pin display device and the displayable range in the z direction of the pin display device 100. Specifically, the magnetic field emitted by the pot magnet 121 of each pin 120 needs to be such that the magnetic force generated with respect to the pot magnet 121 included in the adjacent pin 120 does not affect the movement of the pins 120. In other words, the interval between the adjacent pin insertion holes 111 needs to be equal to or greater than the shortest distance in which the magnetic force generated with respect to the pot magnet 121 included in the pin 120 to be inserted into the adjacent pin insertion hole 111 does not affect the movement of the pins 120.

Note that, according to experiments by the inventor, it is clear that the shortest distance in which the magnetic force generated with respect to the pot magnet 121 included in the pin 120 to be inserted into the adjacent pin insertion hole 111 does not affect the movement of the pins 120 depends on the maximum value of the attractive force generated between a first pot magnet 121 and a second pot magnet 121 in a state where the first pot magnet 121 included in a first pin 120 inserted into a certain pin insertion hole 111 and the second pot magnet 121 included in a second pin 120 inserted into a pin insertion hole 111 adjacent to the pin insertion hole 111 are independently moved in the z direction. Given the fact that pot magnets having the same configuration and characteristics are used for the first pot magnet 121 and the second pot magnet 121, the maximum value of the attractive force can be calculated by, for example, the sum of the maximum value (hereinafter, referred to as a "first maximum value" for convenience) of the magnetic flux density on a cylindrical surface at a distance of ½ of the interval from the central axis of the pot magnet 121 on the lower surface 121*a* side of the first pot magnet 121 and the maximum value (hereinafter, referred to as a "second maximum value" for convenience) of the magnetic flux density on a cylindrical surface at a distance of ½ of the interval from the central axis of the pot magnet 121 on the opposite side (that is, the upper surface side) to the lower surface 121*a* of the second pot magnet 121. In the pin display device 100 mounted by the inventor, when the sum of the first maximum value and the second maximum value is 4 mT or less, it has been found that the magnetic force generated with respect to the pot magnet 121 included in the pin 120 to be inserted into the adjacent pin insertion hole 111 does not affect the movement of the pins 120. Accordingly, for example, for the same pot magnet as that used for the pot magnet 121, it is sufficient if the maximum value of the magnetic flux density on the cylindrical surface at the same distance from the central axis of the pot magnet is measured for each of the lower surface side of the pot magnet and the upper side of the pot magnet, and the distance from the central axis at which the sum of the maximum value of the magnetic flux density on the lower surface side and the maximum value of the magnetic flux density on the upper side is 4 mT or less is doubled, and the resulting distance is the shortest distance in which the magnetic force generated with respect to the pot magnet 121 included in the pin 120 to be inserted into the adjacent pin insertion hole 111 does not affect the movement of the pins 120.

However, since the shortest distance at which the magnetic force generated with respect to the pot magnet 121 included in the pin 120 to be inserted into the adjacent pin insertion hole 111 does not affect the movement of the pins 120 is based not only on the spatial spread of the magnetic flux formed by the pot magnet 121 but also on various factors such as the weight of the pin 120 and the friction between the pin 120 and the pin insertion hole 111, the shortest distance is favorably experimentally determined.

<Magnetic Sheet 200>

As described above, the lower surface 110*a* of the housing 110 is disposed in contact with or in proximity to the upper surface 200*a* of the magnetic sheet 200. In the magnetic sheet 200, portions of the upper surface 200*a* facing respective pot magnets 121 are magnetized such that the respective pins 120 including the respective pot magnets 121 have a desired level of moving amount in the z direction by the repulsive force due to the magnetic force generated between the respective pot magnets 121 and the upper surface 200*a* of the magnetic sheet 200. The magnetic sheet 200 is a rewritable magnetic sheet, that is, a magnetic sheet capable of arbitrarily setting whether to set the S pole or the N pole by exposing each portion of each surface to a strong magnetic field equal to or greater than a predetermined value. An example of the rewritable magnetic sheet is a sheet formed by mixing a powdery ferromagnetic material and a material that does not block or reduce a magnetic force line, does not control the path of a magnetic force line, and does not generate a magnetic force line, like a ferrite magnetic rubber sheet.

<Gap 112>

Since the orientation of the local magnetic pole of the magnetic sheet 200 can be rewritten, when the upper surface 200*a* of the magnetic sheet 200 and the pot magnet 121 come into contact with each other or come close to each other to a considerably close distance without being in contact with each other, the orientation of the magnetic pole of the portion of the upper surface 200*a* of the magnetic sheet 200 facing the pot magnet 121 is rewritten by the magnetic field emitted by the pot magnet 121. Then, the repulsive force is not generated between the pot magnet 121 and the portion of the upper surface 200*a* of the magnetic sheet 200 facing the pot magnet 121. As a result, the pin 120 does not move, and the pin display device 100 does not display. Conversely, when the pot magnet 121 is too far from the upper surface 200*a* of the magnetic sheet 200, even in a state where the upper surface 200*a* of the magnetic sheet 200 is magnetized as desired, the repulsive force is not generated between each pot magnet 121 and the upper surface 200*a* of the magnetic sheet 200, and the pin display device 100 does not display as desired. From these, as in the cross-sectional diagram of the housing 110 illustrated in FIG. 7, it is necessary to provide a gap 112 having a length in the z direction between the lower surface 110*a* of the housing 110 and the lower surface 111*a* of each pin insertion hole 111 of the housing 110 (that is, the bottom of each pin insertion hole 111), the length in the z direction being equal to or greater than the shortest distance (hereinafter, referred to as “first shortest distance”) at which the polarity of the same magnetic sheet (that is, a magnetic sheet having the same base material, the same ferromagnetic material, and the same mixing ratio as those of the magnetic sheet 200, a magnetic sheet of the same type as the magnetic sheet 200) used for the magnetic sheet 200 is not rewritten by the magnetic field emitted by the same pot magnet (that is, a pot magnet that emits the same magnetic field as the pot magnet 121) used for the pot magnet 121, and being equal to or shorter than the longest distance at which the magnetic force is not generated between the same pot magnet (that is, a pot magnet that emits the same magnetic field as the pot magnet 121) used for the pot magnet 121 and the same magnetic sheet (that is, a magnetic sheet having the same base material, the same ferromagnetic material, and the same mixing ratio as those of the magnetic sheet 200, a magnetic sheet of the same type as the magnetic sheet 200) used for the magnetic sheet 200. Note that, as the gap is closer to the longest distance at which the magnetic force is not generated between the same pot magnet as used for the pot magnet 121 and the same magnetic sheet as used for the magnetic sheet 200, the pin 120 cannot be moved more, and variations in display by the pin display device 100 are reduced. Accordingly, in consideration of this viewpoint, the length of the gap 112 in the z direction is favorably the shortest distance or a length slightly exceeding the shortest distance at which rewriting of the same magnetic sheet as used for the magnetic sheet 200 does not occur due to the magnetic field emitted by the same pot magnet as used for the pot magnet 121, that is, the first shortest distance or a length slightly exceeding the first shortest distance.

However, when the magnetic sheet is exposed to a magnetic field in a direction opposite to a certain strength, although the magnetic field is not strong enough to rewrite the orientation of the magnetic pole, the magnetic field to be emitted becomes weak. Accordingly, the length of the gap 112 in the z direction is favorably set in consideration of this. When the length of the gap 112 in the z direction is close to the shortest distance (that is, the first shortest distance) at which the polarity of the magnetic sheet of the same material as used for the magnetic sheet 200 is not rewritten by the magnetic field emitted from the same pot magnet as used for the pot magnet 121, the magnetic pole of the portion of the upper surface 200*a* of the magnetic sheet 200 facing the pot magnet 121 is weakened by the magnetic field emitted from the pot magnet 121. Then, the repulsive force becomes weak between the pot magnet 121 and the portion of the upper surface 200*a* of the magnetic sheet 200 facing the pot magnet 121. As a result, the pin 120 does not move, and the pin display device 100 may not display. Accordingly, the length of the gap 112 in the z direction is favorably equal to or greater than the shortest distance (hereinafter, referred to as “second shortest distance”) at which the magnetic force of the same magnetic sheet as used for the magnetic sheet 200 is not weakened by the magnetic field emitted by the same pot magnet as used for the pot magnet 121. Note that the second shortest distance is longer than the first shortest distance. From the above, the length of the gap 112 in the z direction needs to be equal to or greater than the first shortest distance, and is desirably equal to or greater than the second shortest distance. The length of the gap 112 in the z direction may be determined experimentally or may be determined based on the calculation described below.

Figure 16B:
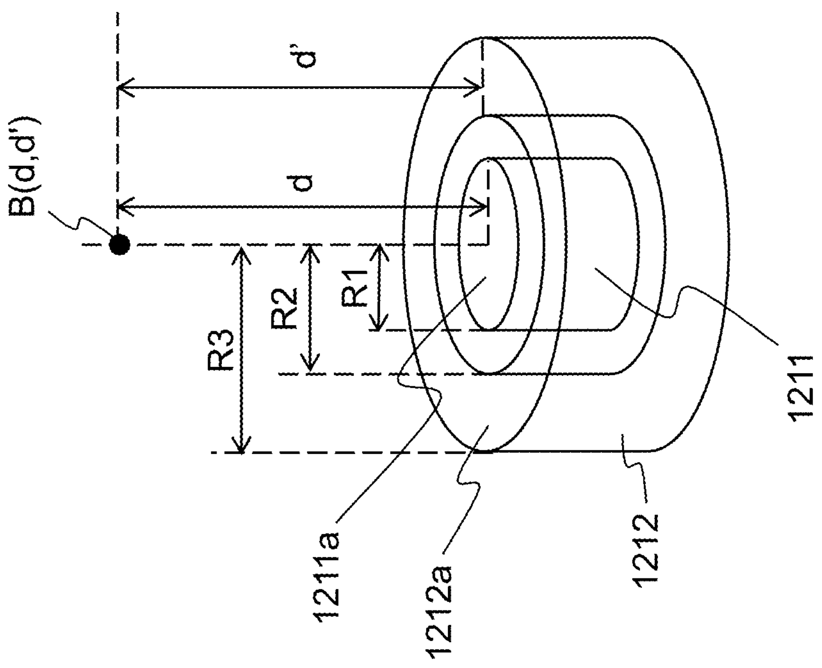
FIG. 16B is a diagram for describing a magnetic flux density B(d,d').
Figure 16A:
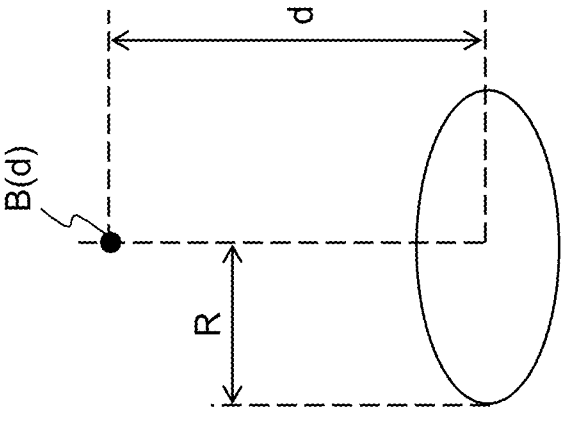
FIG. 16A is a diagram for describing a magnetic flux density B(d).

First, a magnetic flux density B(d) at a point at distance d in the perpendicular direction from the center of a magnetic pole surface by the magnetic charge distributed on the magnetic pole surface on one side of a circular magnet having radius R, which is residual magnetic flux density Br, illustrated in FIG. 16A is approximately indicated by Formula (1) described below. Note that, hereinafter, it is assumed that the unit of the length is mm and the unit of the magnetic flux density is mT.

[Math. 1]

$$B(d) = \frac{Br}{2}\left(1 - \frac{d}{\sqrt{d^2 + R^2}}\right) \tag{1}$$

On the lower surface 121*a* of the pot magnet 121, there are a magnetic pole surface by the pole 1211*a* of the permanent magnet 1211 and a magnetic pole surface by the opening 1212*a* of the container 1212, which is a pole opposite to the pole 1211*a* of the permanent magnet 1211. Since the pole 1211*b*, which is a pole opposite to the pole 1211*a* of the permanent magnet 1211, is in contact with the contact surface 1212*b* on the inner side of the container 1212, the magnetic flux emitted from the pole 1211*b* of the permanent magnet 1211 passes through the container 1212 and is dispersed and emitted from the opening 1212*a* of the container 1212, so that the opening 1212*a* acts like a magnetic pole. However, a part of the magnetic flux leaks to the periphery of the container 1212. Accordingly, when the radius of the poles 1211*a* and 1211*b* of the permanent magnet 1211 is R1, the radius of the inner periphery of the opening 1212*a* of the container 1212 is R2, the radius of the outer periphery of the opening 1212*a* of the container 1212 is R3, the area of the poles 1211*a* and 1211*b* of the permanent magnet 1211 is S1, the area of the opening 1212*a* of the container 1212 is S2, the residual magnetic flux density of the permanent magnet 1211 is Br, and the loss factor based on leakage is c, the magnetic flux density B(d,d') at a point that is distance d in the perpendicular direction from the center of the pole 1211*a* of the permanent magnet 1211 and distance d' in the perpendicular direction from the center of the opening 1212*a* of the container 1212 illustrated in FIG. 16B can be calculated by Formula (2) described below.

[Math. 2]

$$
\begin{aligned}
B(d, d') &= \frac{Br}{2}\left(1 - \frac{d}{\sqrt{d^2 + R1^2}}\right) - c\frac{Br}{2}\frac{S1}{S2}\left\{\left(1 - \frac{d'}{\sqrt{d'^2 + R3^2}}\right) - \left(1 - \frac{d'}{\sqrt{d'^2 + R2^2}}\right)\right\} \\
&= \frac{Br}{2}\left\{1 - \frac{d}{\sqrt{d^2 + R1^2}} + c\frac{R1^2}{R3^2 - R2^2}\left(\frac{d'}{\sqrt{d'^2 + R3^2}} - \frac{d'}{\sqrt{d'^2 + R2^2}}\right)\right\}
\end{aligned}
\quad (2)
$$

Note that when the permanent magnet 1211 is a neodymium magnet, the residual magnetic flux density Br of the permanent magnet 1211 is about 800 mT to 1200 mT. In addition, the loss factor c depends on the magnetic permeability, the thickness, and the shape of the container 1212, but is generally about 0.8 and substantially in a range of 0.5 to 1.0. In addition, when the pole 1211*a* of the permanent magnet 1211 and the opening 1212*a* of the container 1212 are on the same plane as illustrated in FIG. 6B, d'=d, and when the pole 1211*a* of the permanent magnet 1211 and the opening 1212*a* of the container 1212 are not on the same plane as illustrated in FIG. 6C, δ is an actual measurement value and d'=d+δ. Note that δ is about 0.2 mm to 0.4 mm as described above.

Accordingly, the length of the gap 112 in the z direction needs to be a length in which the distance between the center of the pole 1211*a* of the permanent magnet 1211 of the pot magnet 121 and the upper surface 200*a* of the magnetic sheet 200 is equal to or greater than the shortest distance d at which the magnetic flux density B(d,d') calculated by Formula (2) using the above-described values is a value that does not rewrite the polarity of the same magnetic sheet as used for the magnetic sheet 200, and/or the distance between the center of the opening 1212*a* of the container 1212 of the pot magnet 121 and the upper surface 200*a* of the magnetic sheet 200 is equal to or greater than the shortest distance d' at which the magnetic flux density B(d,d') calculated by Formula (2) using the above-described values is a value that does not rewrite the polarity of the same magnetic sheet as used for the magnetic sheet 200. In addition, the length of the gap 112 in the z direction is desirably a length in which the distance between the center of the pole 1211*a* of the permanent magnet 1211 of the pot magnet 121 and the upper surface 200*a* of the magnetic sheet 200 is equal to or greater than the shortest distance d at which the magnetic flux density B(d,d') calculated by Formula (2) using the above-described values is a value that does not weaken the magnetic force of the same magnetic sheet as used for the magnetic sheet 200, and/or a length in which the distance between the center of the opening 1212*a* of the container 1212 of the pot magnet 121 and the upper surface 200*a* of the magnetic sheet 200 is equal to or greater than the shortest distance d' at which the magnetic flux density B(d,d') calculated by Formula (2) using the above-described values is a value that does not weaken the magnetic force of the same magnetic sheet as used for the magnetic sheet 200.

According to an experiment by the inventor, in a pot magnet having a diameter of 5 mm and a height of 5 mm, and a diameter of a permanent magnet of 3 mm and a height of 2 mm, a surface magnetic flux density at the center of the lower surface of the pot magnet was about 300 mT. As a result of an experiment in which the pin 120 including this pot magnet as the pot magnet 121 was lifted up by the magnetic sheet 200 using the housing 110 in which the length of the gap 112 in the z direction was variously varied, the pin 120 was not lifted up when the distance in the z direction between the opening 1212*a* of the container 1212 of the pot magnet 121 and the upper surface 200*a* of the magnetic sheet 200 was 0.5 mm or less, the behavior of the pin 120 was not stable when the distance in the z direction between the opening 1212*a* of the container 1212 of the pot magnet 121 and the upper surface 200*a* of the magnetic sheet 200 was 0.5 to 0.8 mm, and the pin 120 was stably lifted up when the distance in the z direction between the opening 1212*a* of the container 1212 of the pot magnet 121 and the upper surface 200*a* of the magnetic sheet 200 was 0.9 mm or more. In addition, at the point where the distance between the opening 1212*a* and the upper surface 200*a* of the magnetic sheet 200 on the central axis of the opening 1212*a* of the container 1212 of the pot magnet 121 is 0.5 mm or less, the magnetic flux density by the pot magnet 121 was 200 mT or more, and the magnetic sheet 200 can be rewritten by the magnetic field emitted by the pot magnet 121. In addition, at the point where the distance between the opening 1212*a* and the upper surface 200*a* of the magnetic sheet 200 on the central axis of the opening 1212*a* of the container 1212 of the pot magnet 121 was 0.5 to 0.8 mm, the magnetic flux density by the pot magnet 121 was 100 to 200 mT, and the magnetic field emitted by the pot magnet 121 was sufficient to temporarily weaken the magnetic field emitted from the magnetic sheet 200. Thus, assuming that the first shortest distance is 0.5 mm and the second shortest distance is 0.8 mm, the inventor has set the length of the gap 112 in the z direction in the pin display device 100 such that the distance in the z direction between the opening 1212*a* of the container 1212 of the pot magnet 121 of the pin display device 100 and the upper surface 200*a* of the magnetic sheet 200 is 1.0 mm in order to more reliably control the pin 120.

When the length of the gap 112 in the z direction is determined on the basis of calculation, when the magnetic flux density that does not weaken the magnetic force of the same magnetic sheet as used for the magnetic sheet 200 is less than 100 mT, it is sufficient if the distance between the center of the pole 1211*a* of the permanent magnet 1211 of the pot magnet 121 and the upper surface 200*a* of the magnetic sheet 200 and/or the distance between the center of the opening 1212*a* of the container 1212 of the pot magnet 121 and the upper surface 200*a* of the magnetic sheet 200 is set so that the magnetic flux density B(d,d') calculated by Formula (2) becomes a value less than 100 mT.

Note that, in the following description, in order to simplify the description, description is given assuming that the length of the gap in the z direction is d.

<Magnetic Pattern of Upper Surface 200*a* of Magnetic Sheet 200>

As described above, in the magnetic sheet 200, portions of the upper surface 200*a* facing respective pot magnets 121 are magnetized such that the respective pins 120 including the respective pot magnets 121 have a desired level of moving amount in the positive direction of the z direction by the repulsive force due to the magnetic force generated between the respective pot magnets 121 and the upper surface 200*a* of the magnetic sheet 200. If each pot magnet 121 and the upper surface 200*a* of the magnetic sheet 200 are in contact with each other, the magnetic pattern of the upper surface 200*a* optimal for lifting the pin 120 is the same as the magnetic pattern of the lower surface 121*a* of the facing pot magnet 121. However, even in a state where each pin 120 does not move at all in the positive direction of the z direction, the lower surface 121*a* of each pot magnet 121 and the upper surface 200*a* of the magnetic sheet 200 are separated from each other by the length d of the gap 112 in the z direction. In addition, in a state where each pin 120 has moved a desired moving amount in the positive direction of the z direction, the lower surface 121*a* of each pot magnet 121 and the upper surface 200*a* of the magnetic sheet 200 are separated by a length obtained by adding each moving amount to the length d of the gap 112 in the z direction. Accordingly, assuming that the desired moving amount of each pin 120 is $D_i$ (where, i is a number for specifying each pin, and is an integer of 1 or more and 25 or less), in order to move each pin 120 the desired moving amount $D_i$ in the positive direction of the z direction, when the distance between the lower surface 121*a* of each pot magnet 121 and the upper surface 200*a* of the magnetic sheet 200 is within a range from d to $d+D_i$, the magnetic force generated between each pot magnet 121 and the upper surface 200*a* of the magnetic sheet 200 needs to generate a repulsive force larger than the gravity acting in the negative direction of the z direction of each pin 120.

Figure 8:
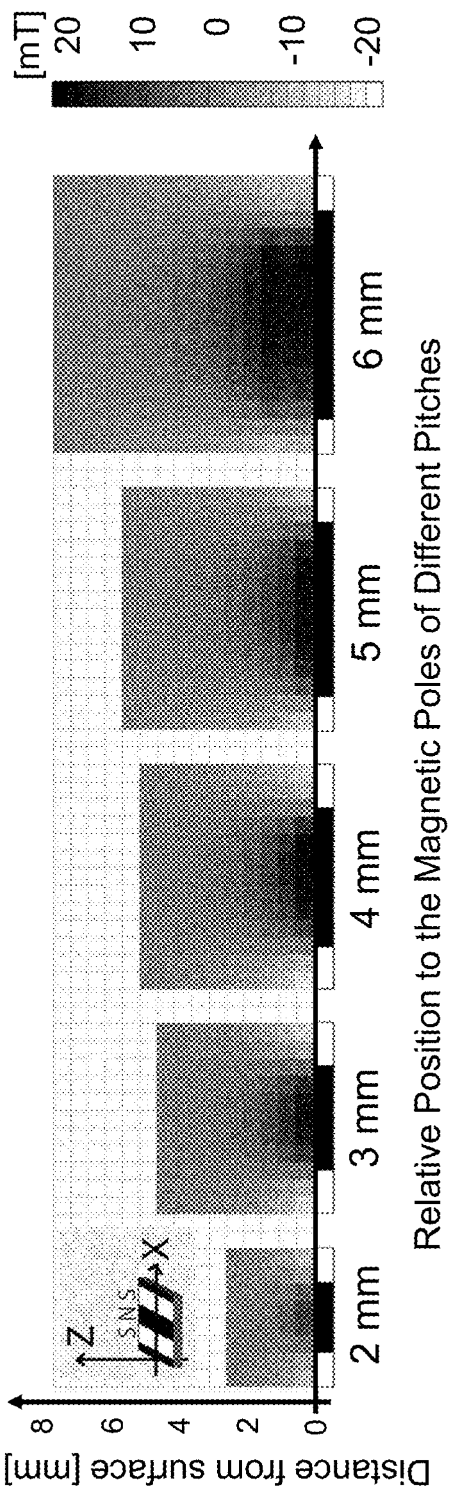
FIG. 8 is a diagram showing a relationship between magnetization of an upper surface of a magnetic sheet and a magnetic flux density in a space near the upper surface of the magnetic sheet.

For this reason, the inventor has paid attention to the fact that when the spatial frequency of the magnetic pattern with which the upper surface of the magnetic sheet is magnetized is different, the spatial spread of the magnetic flux in the three-dimensional space on the upper surface side of the magnetic sheet is different. FIG. 8 is a result of measuring a magnetic flux density in a space in the vicinity of the upper surface of the magnetic sheet by the inventor by magnetizing the upper surface of the magnetic sheet with stripe-shaped magnetic pattern having a band-shaped N pole and S poles sandwiching the N pole having a width of 2 mm to 6 mm. In FIG. 8, the horizontal axis is the transverse direction of the band, and the vertical axis is the distance from the upper surface. As illustrated in FIG. 8, when the width of the band-shaped pole is narrow (that is, when the length of the band-shaped pole in the transverse direction is short), the spatial spread of the magnetic flux is narrow, and the magnetic force lines are concentrated near the band-shaped pole, and when the width of the band-shaped pole is wide (that is, when the length of the band-shaped pole in the transverse direction is long), the spatial spread of the magnetic flux is wide, and the magnetic force lines are far from the band-shaped pole.

Considering the spatial spread of the magnetic flux in the three-dimensional space on the upper surface side of the magnetic sheet, the magnetic pattern of the upper surface 200*a* of the magnetic sheet 200 suitable for lifting the pins 120 is similar to the magnetic pattern of the lower surface 121*a* of the facing pot magnet 121, and is a magnetic pattern slightly larger than the magnetic pattern of the lower surface 121*a* of the facing pot magnet 121. Accordingly, in the case of using the pin 120 including the pot magnet 121 illustrated in FIGS. 6A to 6C, it is sufficient if the portion of the upper surface 200*a* of the magnetic sheet 200 facing the pot magnet 121 of the pin 120 the moving amount in the positive direction of the z direction of which is desired to be maximized is magnetized with, for example, a magnetic pattern formed of a circular pole (for example, N pole) having substantially the same size as the lower surface 121*a* of the facing pot magnet 121 and same as the pole 1211*a* of the permanent magnet 1211 and a ring-shaped pole (for example, S pole) surrounding the circle and opposite to the pole 1211*a* of the permanent magnet 1211.

<Display at Various Heights of Upper End of Pin 120>

In order to cause the pin display device 100 to display at various heights of the upper end of the pin 120, it is necessary to control the moving amount of each pin 120 in the positive direction of the z direction. However, since the pin display device 100 displays information by the three-dimensional point group formed by the upper ends (upper surfaces 120*b*) of the plurality of pins 120, it is not necessary to strictly control the magnitude of the moving amount of each pin 120 in the positive direction of the z direction, and display at various heights of the upper ends of the plurality of pins 120 can be achieved by controlling the relative magnitude of the moving amount of each pin 120 in the positive direction of the z direction. The relative magnitude of the moving amount of each pin 120 in the positive direction of the z direction can be controlled in consideration of the spatial spread of the magnetic flux in the three-dimensional space on the upper surface side of the magnetic sheet.

In the case of using the pin 120 including the pot magnet 121 illustrated in FIGS. 6A to 6C, for example, when the portion of the upper surface 200*a* of the magnetic sheet 200 facing the pot magnet 121 of the pin 120 to be largely moved is magnetized with a magnetic pattern close to the magnetic pattern formed of a circular pole (for example, N pole) having substantially the same size as the lower surface 121*a* of the facing pot magnet 121 and same as the pole 1211*a* of the permanent magnet 1211 and a ring-shaped pole (for example, S pole) surrounding the circle and opposite to the pole 1211*a* of the permanent magnet 1211, the relative magnitude of the moving amount of each pin 120 in the positive direction of the z direction can be controlled. In addition, in the case of using the pin 120 including the pot magnet 121 illustrated in FIGS. 6A to 6C, and in the case of using the magnetic pattern of a band region pole and opposite poles sandwiching the band region pole as the magnetic pattern of the upper surface 200*a* of the magnetic sheet 200, when the portion of the upper surface 200*a* of the magnetic sheet 200 facing the pot magnet 121 of the pin 120 to be largely moved is magnetized with a magnetic pattern close to the magnetic pattern formed of the band region of the same pole (for example, N pole) as the pole 1211*a* of the permanent magnet 1211 and the region of the pole (for example, S pole) opposite to the pole 1211*a* of the permanent magnet 1211 disposed on both sides of the band region, in which the diameter of the lower surface 121*a* of the facing pot magnet 121 is set to the width of the band region, the relative magnitude of the moving amount of each pin 120 in the positive direction of the z direction can be controlled. Note that magnetization of a portion of the upper surface 200*a* of the magnetic sheet 200 that does not face a portion immediately below or a peripheral edge of the pot magnet 121 of any pin 120 is arbitrary.

Figure 9A:
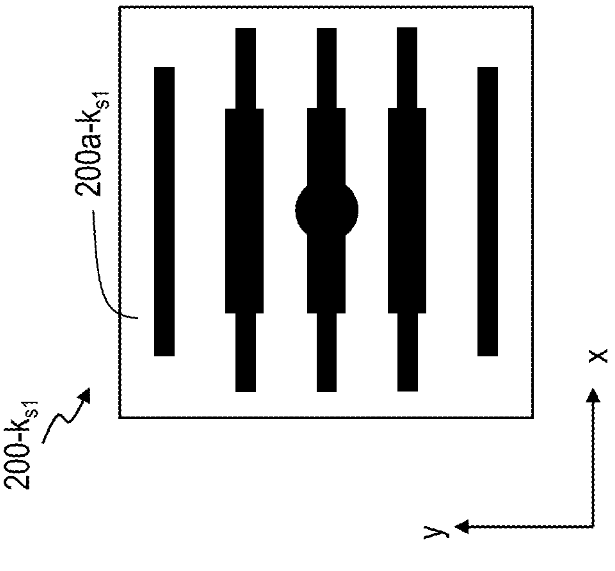
FIG. 9A is a diagram schematically showing an example of a magnetic pattern of a magnetic sheet 200.
Figure 9B:
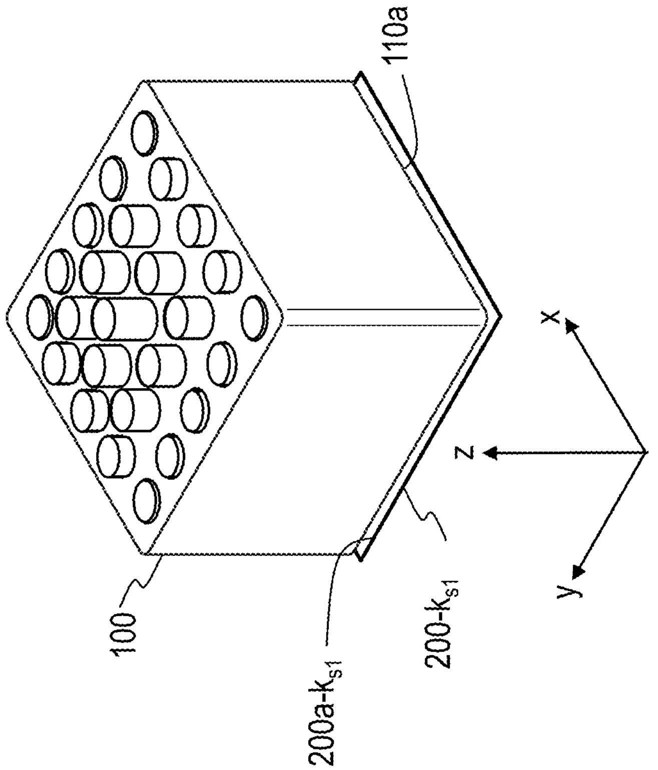
FIG. 9B is a perspective diagram illustrating a display state of the pin display device 100 when the magnetic sheet 200 is magnetized with the magnetic pattern illustrated in FIG. 9A.

Accordingly, in a case where the pole 1211*a* of the permanent magnet 1211 of the pot magnet 121 is N pole, and as in the magnetic pattern illustrated in FIG. 9A, in a case where a portion of the upper surface 200*a* of the magnetic sheet 200, which is colored in dark color in FIG. 9A, is magnetized as an N pole, and a portion of the upper surface 200*a* of the magnetic sheet 200, which is not colored in dark color in FIG. 9A, is magnetized as an S pole, when the lower surface 110*a* of the housing 110 of the pin display device 100 and the upper surface 200*a* of the magnetic sheet 200 are disposed in contact with or in proximity to each other, the pin display device 100 displays as illustrated in FIG. 9B. That is, as can be seen from FIGS. 9A and 9B, a portion of the upper surface 200*a* of the magnetic sheet 200 facing each of the pot magnets 121 of the plurality of pins 120 to be moved in the positive direction of the z direction is magnetized with a magnetic pattern of a first portion that is the same pole (for example, N pole) as the pole 1211*a* of the permanent magnet 1211 of the facing pot magnet 121 and a second portion that surrounds the first portion and is a pole (for example, S pole) opposite to the pole 1211*a*, and the magnetic pattern with which a portion of the upper surface 200*a* of the magnetic sheet 200 facing the pot magnet 121 of the pin 120 the moving amount in the positive direction of the z direction of which is a first moving amount among the plurality of pins 120 to be moved in the positive direction of the z direction is magnetized and the magnetic pattern with which a portion facing the pot magnet 121 of the pin 120 the moving amount in the positive direction of the z direction of which is a second moving amount different from the first moving amount among the plurality of pins 120 to be moved in the positive direction of the z direction is magnetized are different.

<High/Low Binary Display of Upper End of Pin 120>

In order to cause the pin display device 100 to perform high/low binary display of the upper end of the plurality of pins 120, it is sufficient if the presence or absence of movement of each pin 120 in the positive direction of the z direction is controlled. In order to control the presence or absence of movement of each pin 120 in the positive direction of the z direction, it is sufficient if a portion of the upper surface 200*a* of the magnetic sheet 200 facing the pot magnet 121 of each pin 120 is magnetized corresponding to whether or not a repulsive force capable of moving each pin 120 including each pot magnet 121 in the positive direction of the z direction acts between each pot magnet 121 and the upper surface 200*a* of the magnetic sheet 200. For example, it is sufficient if a portion of the upper surface 200*a* of the magnetic sheet 200 facing each of the pot magnets 121 of the pins 120 to be moved in the positive direction of the z direction is magnetized with a magnetic pattern of a first portion that is the same pole (for example, N pole) as the pole 1211*a* of the permanent magnet 1211 of the facing pot magnet 121 and a second portion that is a portion surrounding the first portion and is a pole (for example, S pole) opposite to the pole 1211*a*. Note that the second portion may completely surround the first portion, or may partially surround the first portion so as to sandwich the first portion from both sides, for example. That is, a portion of the upper surface 200*a* of the magnetic sheet 200 facing each of the pot magnets 121 of the pins 120 to be moved in the positive direction of the z direction may be magnetized with a stripe-shaped magnetic pattern of a first portion that is a band region of the same pole (for example, N pole) as the pole 1211*a* of the permanent magnet 1211 of the facing pot magnet 121 and a second portion that is on both sides of the first portion and is a pole (for example, S pole) opposite to the pole 1211*a*. It is sufficient if a portion of the upper surface 200*a* of the magnetic sheet 200 facing each of the pot magnets 121 of the pins 120 not to be moved in the positive direction of the z direction is magnetized with a magnetic pattern that is not a magnetic pattern of a third portion that is the same pole (for example, N pole) as the pole 1211*a* of the permanent magnet 1211 of the facing pot magnet 121 and a fourth portion that is a portion surrounding the third portion and is a pole (for example, S pole) opposite to the pole 1211*a*. For example, a portion facing each of the pot magnets 121 of the pins 120 not to be moved in the positive direction of the z direction may be magnetized with a magnetic pattern of a portion that is a pole (for example, S pole) opposite to the pole 1211*a* of the permanent magnet 1211 of the facing pot magnet 121 and a portion that surrounds the portion and is the same pole (for example, N pole) as the pole 1211*a*, may be magnetized with only a pole (for example, S pole) opposite to the pole 1211*a* of the permanent magnet 1211 of the facing pot magnet 121, or may be magnetized with only the same pole (for example, N pole) as the pole 1211*a* of the permanent magnet 1211 of the facing pot magnet 121. Note that magnetization of a portion of the upper surface 200*a* of the magnetic sheet 200 that does not face a portion immediately below or a peripheral edge of the pot magnet 121 of any pin 120 is arbitrary.

Figure 10B:
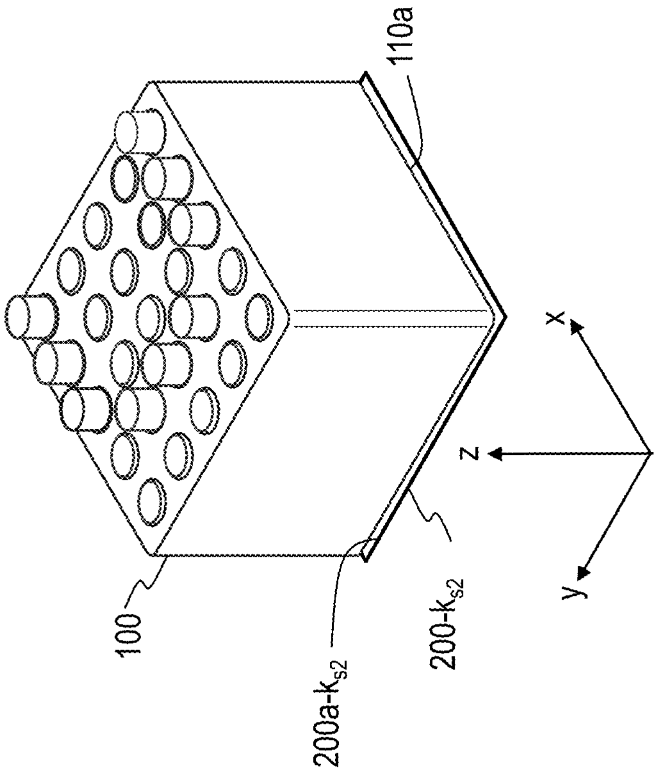
FIG. 10B is a perspective diagram illustrating a display state of the pin display device 100 when the magnetic sheet 200 is magnetized with the magnetic pattern illustrated in FIG. 10A.
Figure 10A:
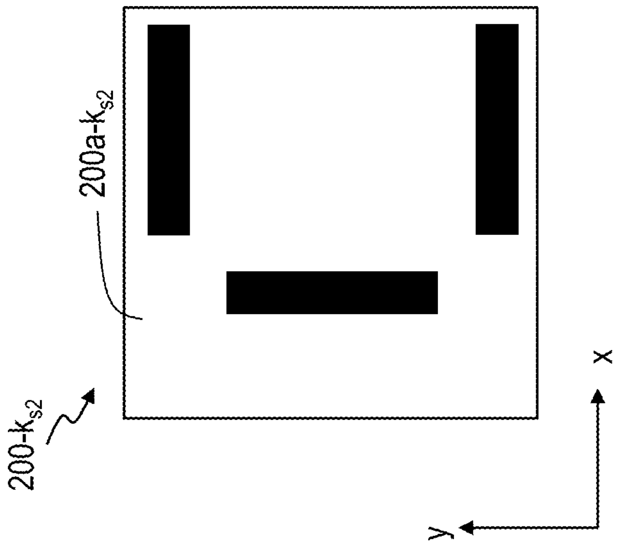
FIG. 10A is a diagram schematically showing another example of a magnetic pattern of the magnetic sheet 200.

Accordingly, in a case where the pole 1211*a* of the permanent magnet 1211 of the pot magnet 121 is N pole, as in the magnetic pattern illustrated in FIG. 10A, in a case where a portion of the upper surface 200*a* of the magnetic sheet 200, which is colored in dark color in FIG. 10A, is magnetized as an N pole, and a portion of the upper surface 200*a* of the magnetic sheet 200, which is not colored in dark color in FIG. 10A, is magnetized as an S pole, when the lower surface 110*a* of the housing 110 of the pin display device 100 and the upper surface 200*a* of the magnetic sheet 200 are disposed in contact with or in proximity to each other, the pin display device 100 displays as illustrated in FIG. 10B.

Note that magnetization with the magnetic patterns illustrated in FIGS. 9A and 10A can be performed, for example, by first magnetizing the entire upper surface 200*a* of the magnetic sheet 200 as S pole, and then bringing the S pole of the neodymium magnet, which is a strong magnet, into contact with the portion of the upper surface 200*a* of the magnetic sheet 200 colored in dark color in FIGS. 9A and 10A. When the portion of the upper surface 200*a* of the magnetic sheet 200 that is colored in dark color in FIGS. 9A and 10A is magnetized, for example, it is sufficient if a magnetizer having an S pole of a neodymium magnet at the tip is used and the tip of the magnetizer is moved so as to draw the portion colored in dark color in FIGS. 9A and 10A by pressing the tip of the magnetizer against the upper surface 200*a* of the magnetic sheet 200.

Second Embodiment

The pin display system 300 described in the first embodiment is merely an example, and various modifications as described in the second embodiment can be made.

<Number of Pins and Pin Insertion Holes, and Disposition of Pin Insertion Holes>

In the first embodiment, the example in which the pin display device 100 includes the 25 pins 120 and pin insertion holes 111 has been described, but it is not limited to this number. That is, it is sufficient if the pin insertion holes are disposed at each of P×Q positions by a set of any one of P x coordinates and any one of Q y coordinates, where P and Q are integers of two or more, and it is sufficient if the number of pins is P×Q. Moreover, the pin insertion holes do not need to be aligned in an array, and it is sufficient if the pin insertion holes include a plurality of pin insertion holes having different x coordinates and a plurality of pin insertion hole having different y coordinates, and it is sufficient if the number of pins is the same as the number of pin insertion holes. In addition, depending on the application, there is a case where it is sufficient if only display on one axis perpendicular to the z direction is performed, and in this case, for example, the x coordinates of all the plurality of pin insertion holes may be the same and only the y coordinates may be different, or the y coordinates of all the plurality of pin insertion holes may be the same and only the x coordinates may be different. That is, it is sufficient if the plurality of pin insertion holes have different positions in a plane perpendicular to the z direction, and it is sufficient if the number of pins is the same as the number of pin insertion holes.

<Shape of Pin and Shape of Pin Insertion Hole>

Although the example in which the pin 120 and the pin insertion hole 111 have a columnar shape has been described in the first embodiment, the shape of the pin and the pin insertion hole is not limited to columnar, but may be a prism or the like, and any shape may be used as long as the shape satisfies the condition that the pin is easily movable in the positive direction and the negative direction of the z direction of the pin insertion hole but hardly moves in the x direction and the y direction.

<Shape of Housing>

In the first embodiment, the example in which the housing 110 of the pin display device 100 has a substantially rectangular parallelepiped outer shape has been described, but the outer shape of the housing is not limited to a substantially rectangular parallelepiped outer shape. For example, in the first embodiment, the example in which the upper surface 110*b* of the housing 110 is a plane parallel to the lower surface 110*a* has been described, but it is not essential that the upper surface of the housing is parallel to the lower surface of the housing, and it is not essential that the upper surface of the housing is a plane. In addition, it is not essential that the housing has a side surface in the x direction or a side surface in the y direction.

<Shape and Material of Pot Magnet, and Strength of Magnet>

In the first embodiment, the example has been described in which the material and the shape of the containers 1212 of the pot magnets 121 included in all the pins 120 are the same, and the material, the shape, and the strength of the permanent magnets 1211 of the pot magnets 121 included in all the pins 120 are the same, but at least any one of the material and the shape of the container 1212 and the material, the shape, and the strength of the permanent magnet 1211 may be different for each pin. However, in a case where at least any one of the material, the shape, and the strength described above is different for each pin, it is necessary to be aware of the difference in at least any one of the material and the shape of the container of the pot magnet of each pin and the material, the shape, and the strength of the permanent magnet when magnetizing the magnetic sheet for desired display, so that the difficulty of creating the magnetic pattern for magnetizing the magnetic sheet increases, and the way of use in which the relative position between the pin display device and the magnetic sheet is changed cannot be performed as will be described below in the fourth embodiment. Accordingly, the material and shape of the containers of the pot magnets included in all the pins and the material, the shape, and the strength of the permanent magnets are favorably the same.

<Pole of Pot Magnet>

In the first embodiment, the example in which the poles 1211*a* of the permanent magnets 1211 of all the pot magnets 121 are the same pole (for example, N pole) has been described, but the pole of the permanent magnet exposed from the opening of the container of the pot magnet may be different for each pin. However, in a case where the pole of the permanent magnet exposed from the opening of the container of the pot magnet is different for each pin, it is necessary to be aware of the polarity of the permanent magnet exposed from the opening portion of the container of the pot magnet of each pin when magnetizing the magnetic sheet for desired display, so that the difficulty of creating the magnetic pattern for magnetizing the magnetic sheet increases, and the way of use in which the relative position between the pin display device and the magnetic sheet is changed cannot be performed as will be described below in the fourth embodiment. Accordingly, the poles of the permanent magnets exposed from the openings of the containers of the pot magnets included in all the pins are favorably the same.

<Presence or Absence of Container>

In the first embodiment, the example in which the pin 120 uses the pot magnet 121 has been described, but the magnet included in the pin is not necessarily the pot magnet, but may be a magnet not including a container. However, in the case of the magnet not including the container, the magnetic force lines are not concentrated on the opening surface of the container, and thus, it is necessary to widen the interval between the pins as compared with the case of using the pot magnet, and the resolution of the display in the x direction and the y direction of the display of the pin display device is lowered. Accordingly, the magnet included in the pin is favorably a pot magnet.

<Stacking of Magnetic Sheets>

In the first embodiment, the example of using one magnetic sheet 200 has been described, but it is not essential to use one magnetic sheet, and a plurality of magnetic sheets may be stacked and used. At that time, a plurality of magnetic sheets may be stacked and then magnetized with the magnetic pattern, or a plurality of magnetic sheets may be stacked and used after each of the magnetic sheets is magnetized with the magnetic pattern. That is, all the magnetic sheets (magnetic sheet materials) to be stacked are magnetized in advance with the same magnetic pattern (the same texture of the S pole and the N pole), and magnetic sheets (stacked magnetic sheets) in which the same textures of all the magnetic sheets to be stacked overlap at the same position may be used as the magnetic sheet 200. In this way, since a stronger magnetic force can be obtained than in a case where only one magnetic sheet is used, the moving amount of the pin in the positive direction of the z direction can be increased. In addition, each magnetic sheet (magnetic sheet material) to be stacked is magnetized in advance with a different magnetic pattern (different textures of the S pole and the N pole), and a stack of these magnetic sheets (stacked magnetic sheets) may be used as the magnetic sheet 200. In this way, it is possible to perform display as if the displays by the magnetic sheets are combined.

Third Embodiment

In the third embodiment, a usage mode of the pin display system of the present invention will be described. In the pin display systems 300 of the first embodiment and the second embodiment, the lower surface 110*a* of the housing 110 of the pin display device 100 and the upper surface 200*a* of the magnetic sheet 200 are disposed in contact with or in proximity to each other to perform display. Accordingly, in order to cause the pin display system 300 to perform various desired displays, it is sufficient to magnetize in advance one surface of each of a plurality of (K, K is an integer of two or more) magnetic sheets 200-*k* (k is each integer of one or more and K or less) with a magnetic pattern (texture of the S pole and the N pole) corresponding to each desired display, to enable selection of one magnetic sheet 200-$k_s$ ($k_s$ is any one integer of one or more and K or less) from among the K magnetic sheets 200-1 to 200-K, and to set the surface of the selected magnetic sheet 200-$k_s$ magnetized in advance with the magnetic pattern as an upper surface 200*a*-$k_s$ so that the upper surface 200*a*-$k_s$ of the magnetic sheet 200-$k_s$ is disposed in contact with or in proximity to the lower surface 110*a* of the housing 110 of the pin display device 100. For example, it is sufficient if the user selects a desired magnetic sheet $k_s$ from the K magnetic sheets 200-1 to 200-K, and dispose the lower surface 110*a* of the housing 110 of the pin display device 100 in contact with or in proximity to the upper surface 200*a*-$k_s$ of the selected magnetic sheet 200-$k_s$. When a simpler expression is adopted, it is sufficient if the selected magnetic sheet 200-$k_s$ is placed with the upper surface 200*a*-$k_s$ facing upward and the pin display device 100 is placed thereon.

For example, when a magnetic sheet 200-$k_{s1}$ ($k_{s1}$ is any one integer of one or more and K or less) magnetized with the magnetic pattern shown in FIG. 9A on the upper surface is selected, and the lower surface 110*a* of the housing 110 of the pin display device 100 is disposed in contact with or in proximity to an upper surface 200*a*-$k_{s1}$ of the selected magnetic sheet 200-$k_{s1}$, the pin display device 100 can be caused to display as shown in FIG. 9B. In addition, for example, when a magnetic sheet 200-$k_{s2}$ ($k_{s2}$ is any one integer of one or more and K or less and different from $k_{s1}$) magnetized with the magnetic pattern shown in FIG. 10A on the upper surface is selected, and the lower surface 110*a* of the housing 110 of the pin display device 100 is disposed in contact with or in proximity to an upper surface 200*a*-$k_{s2}$ of the selected magnetic sheet 200-$k_{s2}$, the pin display device 100 can be caused to display as shown in FIG. 10B.

Note that the pin display system may include a selection unit that is a mechanical mechanism that selects the magnetic sheet $k_s$ corresponding to selection information received by an input unit from among the K magnetic sheets 200-1 to 200-K by receiving a selection operation of the user to select any magnetic sheet $k_s$ from the K magnetic sheets 200-1 to 200-K, and a disposition unit that is a mechanical mechanism that disposes the lower surface 110*a* of the housing 110 of the pin display device 100 in contact with or in proximity to the upper surface 200*a*-$k_s$ of the magnetic sheet 200-$k_s$ selected by the selection unit.

Fourth Embodiment

In the fourth embodiment, a usage mode of the pin display system of the present invention will be described. Even when a plurality of magnetic sheets is not used as in the third embodiment, the pin display system 300 can perform various desired displays by changing the relative position between the pin display device 100 and the magnetic sheet 200 when the relative position can be changed in a direction perpendicular to the z direction in a state where different positions on the upper surface 200*a* of the magnetic sheet 200 having an area larger than that of the lower surface 110*a* of the housing 110 of the pin display device 100 are magnetized in advance with the magnetic pattern (the texture of the S pole and the N pole) corresponding to each desired display, and the lower surface 110*a* of the housing 110 of the pin display device 100 and the upper surface 200*a* of the magnetic sheet 200 are brought into contact with or into proximity to each other. In addition, with the pin display system 300 of the fourth embodiment, a wave, a pattern, a shape change, and the like can be displayed by using a change in the relative position between the pin display device 100 and the magnetic sheet 200.

For example, it is sufficient if the user changes the relative position between the pin display device 100 and the magnetic sheet 200 in a direction perpendicular to the z direction in a state where different positions on the upper surface of the magnetic sheet 200 having an area larger than that of the lower surface 110*a* of the housing 110 of the pin display device 100 are magnetized in advance with the magnetic pattern corresponding to each desired display, and the lower surface 110*a* of the housing 110 of the pin display device 100 and the upper surface 200*a* of the magnetic sheet 200 are brought into contact with or into proximity to each other. When a simpler expression is adopted, it is sufficient if the magnetic sheet 200 is placed with the upper surface 200*a* facing upward, the pin display device 100 is placed thereon, and the pin display device 100 or/and the magnetic sheet 200 are moved in a direction perpendicular to the z direction by being gripped or supported by the user.

Figure 11:
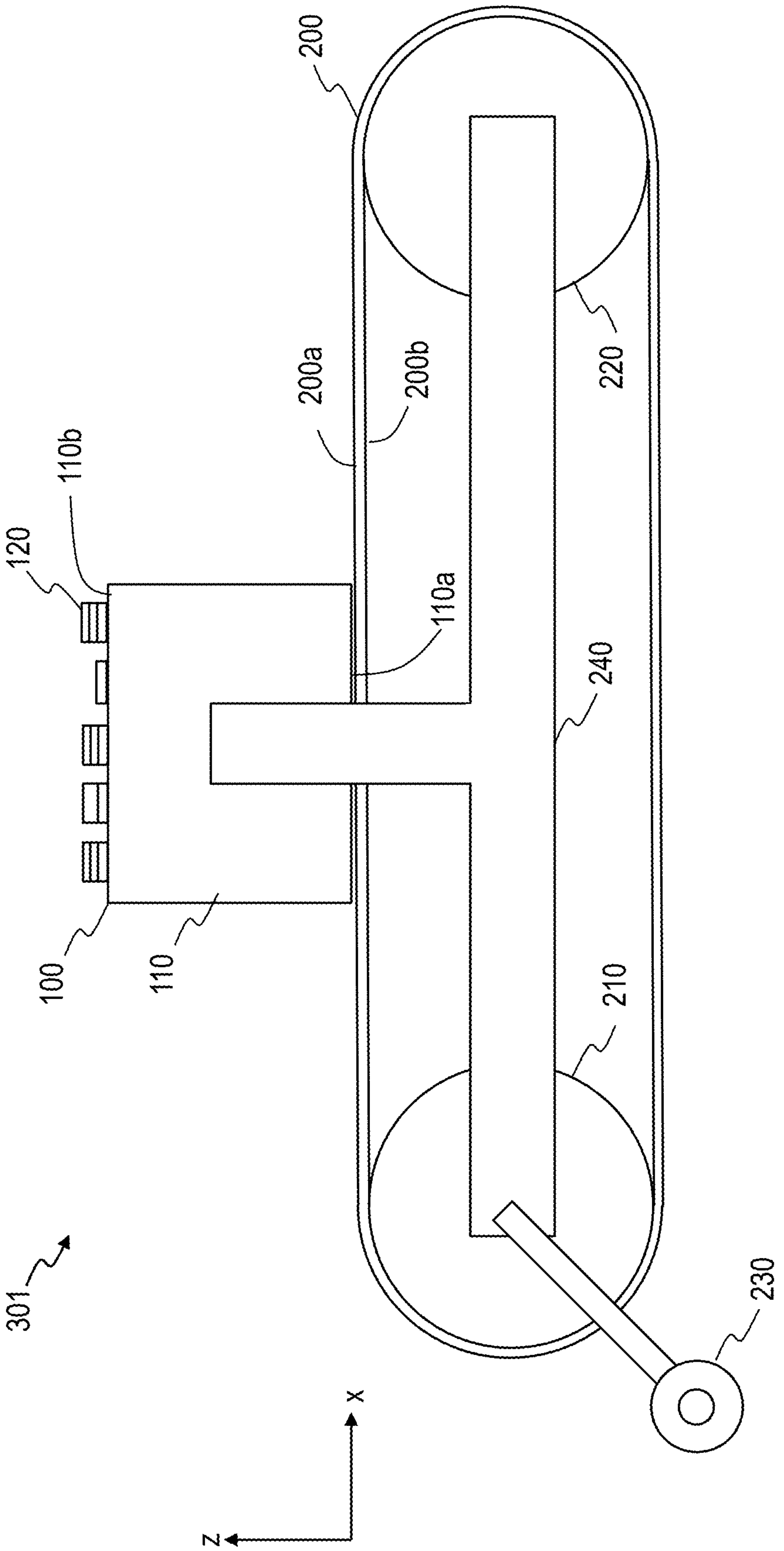
FIG. 11 is a side diagram illustrating a pin display system 301.

Alternatively, the pin display system may include a mechanical mechanism that changes the relative position between the pin display device 100 and the magnetic sheet 200 in a direction perpendicular to the z direction in a state where the lower surface 110*a* of the housing 110 of the pin display device 100 is disposed in contact with or in proximity to the upper surface 200*a* of the magnetic sheet 200. An example of this pin display system is shown in FIG. 11. The pin display system 301 of FIG. 11 includes the pin display device 100, the magnetic sheet 200, a first roller 210, a second roller 220, a handle 230, and a support tool 240. The magnetic sheet 200 has an endless belt shape. The first roller 210 and the second roller 220 are supported by the support tool 240, are disposed such that their axes are parallel to each other, and support the magnetic sheet 200 having an endless belt shape from a lower surface 200*b* side. The handle 230 is fixed to the first roller 210 and rotates simultaneously with the first roller 210. The pin display device 100 is supported by the support tool 240 in a state where the lower surface 110*a* of the housing 110 of the pin display device 100 is disposed in contact with or in proximity to the upper surface 200*a* of the magnetic sheet 200. Thus, when the user rotates the handle 230 clockwise or counterclockwise, the first roller 210 and the second roller 220 rotate in the same direction as the handle 230, and the relative position between the pin display device 100 and the magnetic sheet 200 can be changed in the x direction that is a direction perpendicular to the z direction in a state where the lower surface 110*a* of the housing 110 of the pin display device 100 is disposed in contact with or in proximity to the upper surface 200*a* of the magnetic sheet 200.

Note that, in a case where the relative position between the pin display device 100 and the magnetic sheet 200 is changed in a direction perpendicular to the z direction and used, magnetization with the same pole as the pole 1211*a* of the permanent magnet 1211 of the pot magnet 121 on the upper surface 200*a* of the magnetic sheet 200 is favorably performed not in a dot shape similar to the pole 1211*a*, but in a band shape in which a direction in which the relative position is changed is a length direction, in order to suppress display from ending in a moment or frequent movement (that is, the pin 120 moves up and down frequently) of the pin 120 in the z direction.

Fifth Embodiment

Figure 12:
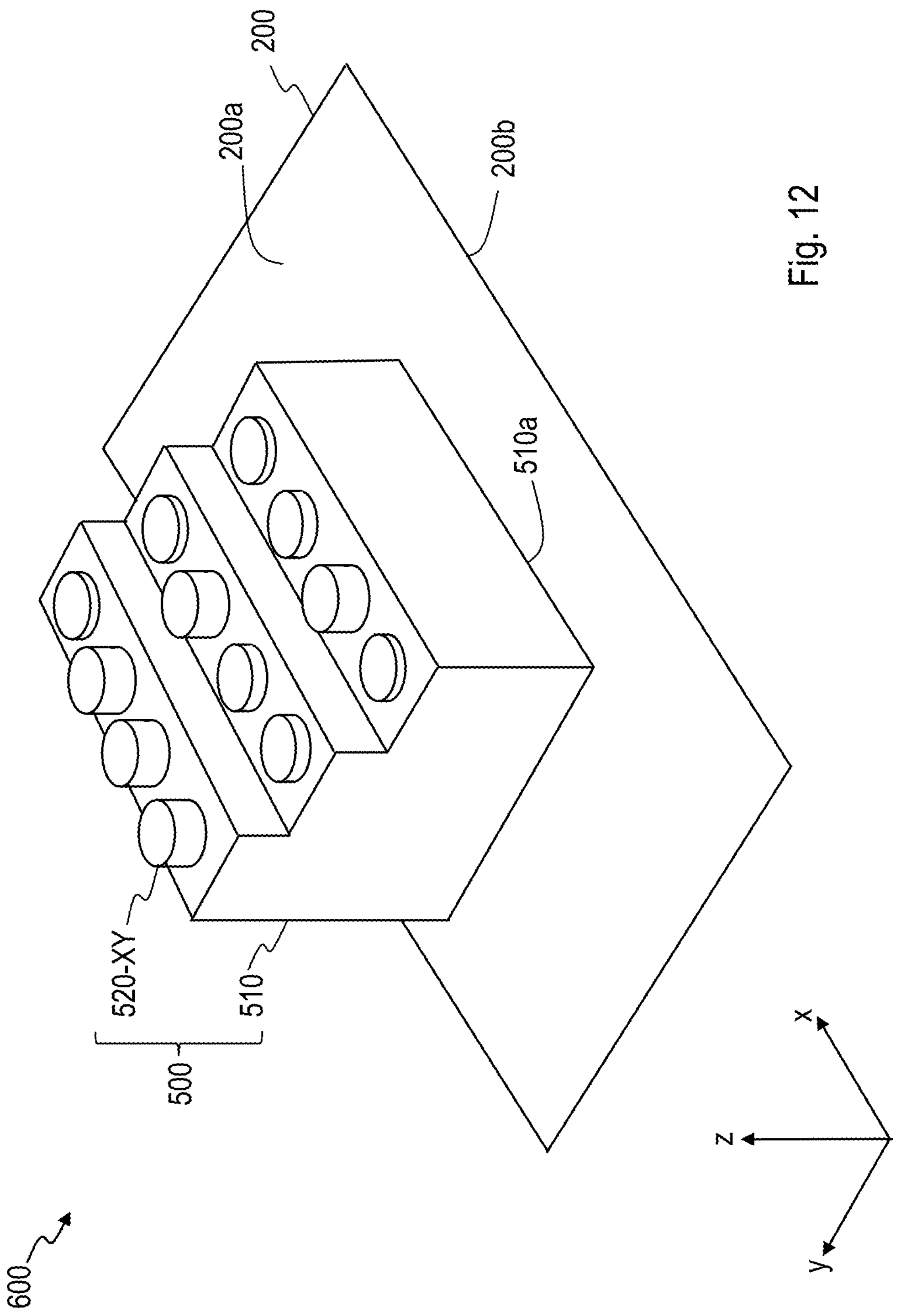
FIG. 12 is a perspective diagram illustrating a pin display system 600.

In a state where the effect of the external magnetic field is negligibly small, the plane formed by the upper ends of all the pins of the pin display device may be inclined with respect to the z direction, and thus the upper side of the housing may be formed in a stepwise manner. This form will be described as the fifth embodiment, focusing on differences from the first embodiment. Hereinafter, X is each integer of one or more and four or less, and Y is each integer of one or more and three or less, and specific examples will be used and described. As illustrated in FIG. 12, the pin display system 600 of the fifth embodiment includes the pin display device 500 and the magnetic sheet 200. The pin display device 500 of the fifth embodiment includes the housing 510 and 12 pins 520-XY. Similar to the pin display device 100 and the magnetic sheet 200 of the first embodiment, the pin display device 500 and the magnetic sheet 200 are disposed such that a lower surface 510*a* of the housing 510 of the pin display device 500 and the upper surface 200*a* of the magnetic sheet 200 are in contact with or in proximity to each other. Similar to the pin display system 300 of the first embodiment, the pin display system 600 of the fifth embodiment can also be used in the usage modes described in the third embodiment and the fourth embodiment.

<Housing 510>

Figure 13:
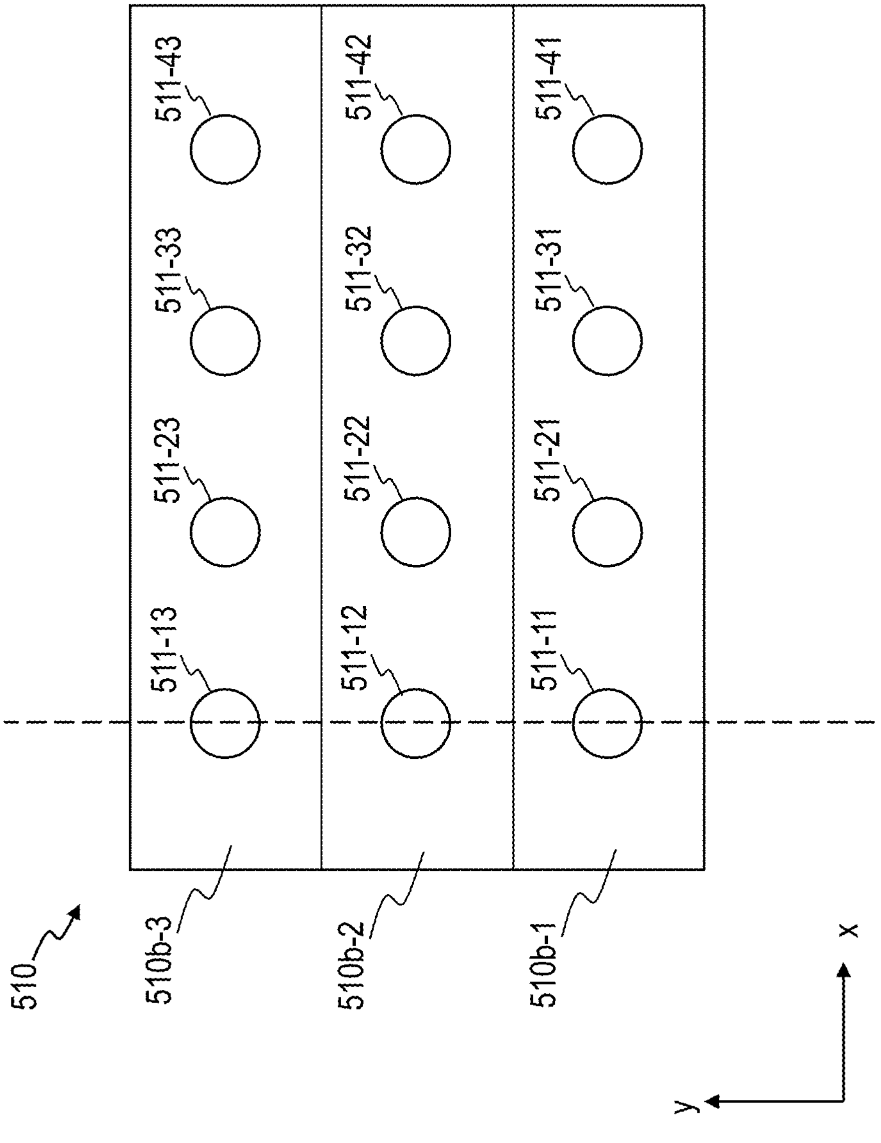
FIG. 13 is a top diagram illustrating a housing 510 of a pin display device 500.
Figure 14:
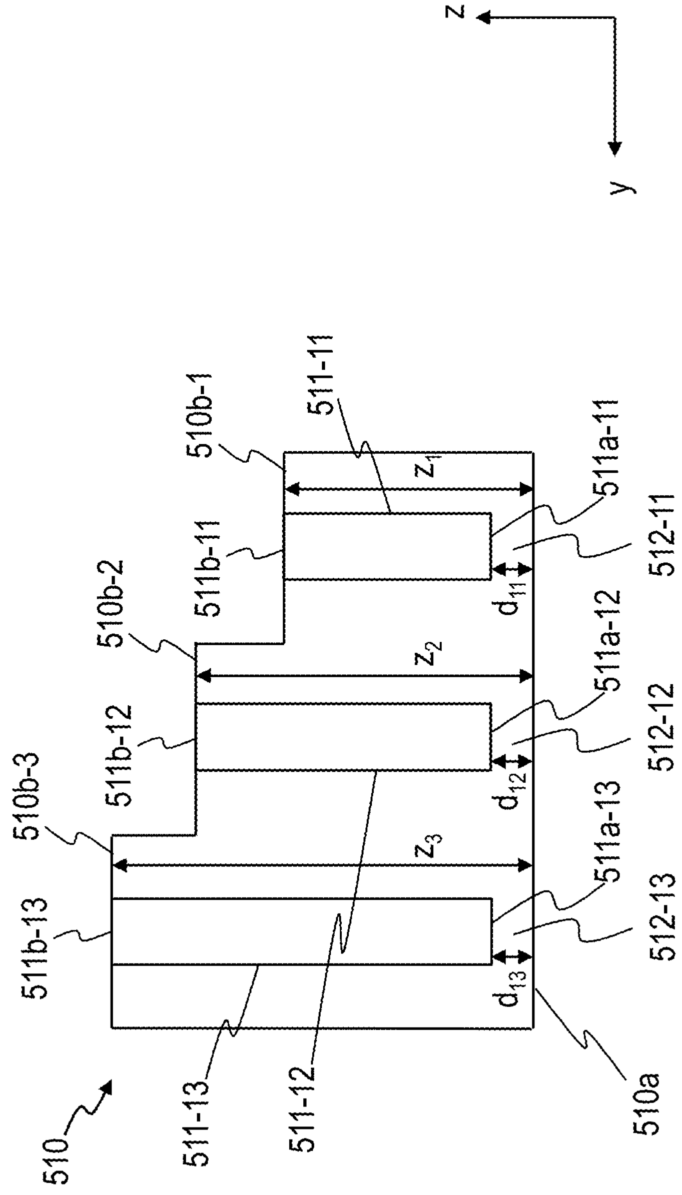
FIG. 14 is a cross-sectional diagram illustrating the housing 510 of the pin display device 500.

As illustrated in FIG. 13 which is a top diagram and FIG. 14 which is a cross-sectional diagram cut along the broken line in FIG. 13, the housing 510 of the pin display device 500 of the fifth embodiment has the lower surface 510*a* which is one plane and three upper surfaces 510*b*-1, 510*b*-2, and 510*b*-3 which are planes which are in the positive direction of the z direction with respect to the lower surface 510*a* and are parallel to the lower surface 510*a* and have different distances from the lower surface 510*a*. The upper surface 510*b*-1 is a surface corresponding to a partial region having the smallest y coordinate among partial regions obtained by dividing the lower surface 510*a* into three equal parts in the y direction and moved by a distance $z_1$ in the z direction. The upper surface 510*b*-2 is a surface corresponding to a partial region having the second smallest y coordinate among partial regions obtained by dividing the lower surface 510*a* into three equal parts in the y direction and moved by a distance $z_2$ in the z direction. The upper surface 510*b*-3 is a surface corresponding to a partial region (that is, a partial region having the largest y coordinate) having the third smallest y coordinate among partial regions obtained by dividing the lower surface 510*a* into three equal parts in the y direction and moved by a distance $z_3$ in the z direction. The distance $z_2$ is larger than the distance $z_1$, and the distance $z_3$ is larger than the distance $z_2$. That is, the distances $z_1$, $z_2$, and $z_3$ from the lower surface 510*a* to the upper surfaces 510*b*-1, 510*b*-2, and 510*b*-3 are larger as the y coordinate is larger.

The housing 510 includes 12 pin insertion holes 511-XY. The 12 pin insertion holes 511-XY are disposed in a 4×3 matrix of 4 at equal intervals in the x direction and 3 at equal intervals in the y direction. Similar to the pin insertion hole 111 of the housing 110 of the first embodiment, each of the pin insertion holes 511-XY is a hole for allowing the pin 520-XY having a columnar shape to be described below to move in the z direction, and has a columnar shape with the central axis in the z direction. Upper surfaces 511*b*-X1 of the four pin insertion holes 511-X1 disposed at equal intervals in the x direction are in the upper surface 510*b*-1 of the housing 510. Upper surfaces 511*b*-X2 of the four pin insertion holes 511-X2 disposed at equal intervals in the x direction are in the upper surface 510*b*-2 of the housing 510. Upper surfaces 511*b*-X3 of the four pin insertion holes 511-X3 disposed at equal intervals in the x direction are in the upper surface 510*b*-3 of the housing 510.

A lower surface 511*a*-XY of each of the pin insertion holes 511-XY is a plane that is in the negative direction of the z direction with respect to the upper surface 511*b*-XY and perpendicular to the z direction, that is, a plane parallel to a lower surface 510*a* of the housing 510. Between the lower surface 511*a*-XY of each of the pin insertion holes 511-XY and the lower surface 510*a* of the housing 510, a gap 512-XY satisfying the conditions described in the first embodiment is provided. That is, a length $d_{XY}$ of all the gaps 512-XY in the z direction has the same value d. In other words, a distance $d_{XY}$ between the lower surfaces 511*a*-XY of all the pin insertion holes 511-XY and the lower surface 510*a* of the housing 510 is the same distance d. Accordingly, the depth (that is, the height of the columnar shape of each pin insertion hole 511-1Y) of each pin insertion hole 511-1Y is $z_1$-d, the depth (that is, the height of the columnar shape of each pin insertion hole 511-2Y) of each pin insertion hole 511-2Y is $z_2$-d, and the depth (that is, the height of the columnar shape of each pin insertion hole 511-3Y) of each pin insertion hole 511-3Y is $z_3$-d.

<Pin 520-XY>

Figure 15:
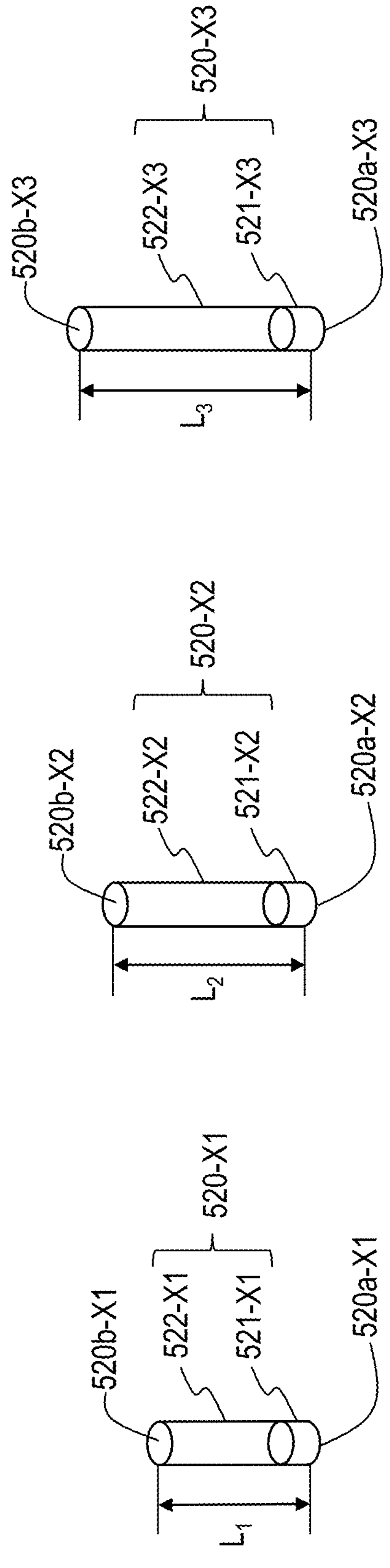
FIG. 15 is a perspective diagram illustrating a pin 520-X1, a pin 520-X2, and a pin 520-X3 of the pin display device 500.

Each pin 520-XY is inserted into the pin insertion hole 511-XY (that is, the pin insertion hole in which the value of X and the value of Y are the same as those of the pin) of the housing 510 corresponding to the pin. As illustrated in FIG. 15, each pin 520-XY has an outer shape having a columnar shape in which one end is a lower surface 520*a*-XY that is a circular plane and the other end is an upper surface 520*b*-XY that is a plane parallel to a lower surface 510*a*-XY. Each pin 520-XY is the same as the pin 120 of the first embodiment except for the length described below. That is, the matters related to a pot magnet 521-XY and a spacer 522-XY of each pin 520-XY are the same as the matters related to the pot magnet 121 and the spacer 122 of the pin 120 of the first embodiment.

The length (that is, the height of the columnar shape of each pin 520-XY) of each pin 520-XY is the same as the depth of the pin insertion hole 511-XY (that is, the pin insertion hole in which the value of X and the value of Y are the same as those of the pin) into which the pin is inserted, or larger than the depth of the pin insertion hole 511-XY into which the pin is inserted. Accordingly, a length $L_1$ of each pin 520-X1 is equal to or greater than $z_1$-d, a length $L_2$ of each pin 520-X2 is equal to or greater than $z_2$-d, and a length $L_3$ of each pin 520-X3 is equal to or greater than $z_3$-d.

However, in the pin display device 500, the plane formed by the upper ends of all the pins are inclined respect to the z direction in a state where the effect of the external magnetic field is negligibly small, the length of the pin 520-XY is favorably slightly larger than the depth of 511-XY into which the pin is inserted even when the length is larger than the depth of 511-XY into which the pin is inserted. Accordingly, when δ' is a sufficiently small value, the length $L_1$ of each pin 520-X1 is $z_1$-d or $z_1$-d+δ', the length $L_2$ of each pin 520-X2 is $z_2$-d or $z_2$-d+δ', and the length $L_3$ of each pin 520-X3 is $z_3$-d or $z_3$-d+δ'.

Modification

The pin display system 600 described above is merely an example, and the pin display system 600 of the fifth embodiment can also be modified in various ways as described in the second embodiment with respect to the pin display system 300 of the first embodiment.

For example, the example in which the housing 510 of the pin display device 500 has the three upper surfaces 510*b*-1, 510*b*-2, and 510*b*-3 having different distances from the lower surface 510*a* has been described above, but the number of upper surfaces may be any number as long as the number of upper surfaces is plural and the distances from the lower surface are different from each other. However, it is favorable that the plurality of upper surfaces be disposed such that the distance from the lower surface is sequentially increased. Note that, in a case where the pin display device 500 of the fifth embodiment has such a form, the numbers of the pin insertion holes 111 and pins 120 included in each pin display device 100 may be at least one. That is, in the pin display device 500 of the fifth embodiment, the upper surface of the housing is J planes corresponding to J (J is an integer of two or more) partial regions different from each other on the lower surface of the housing and moved by different distances in the positive direction of the z direction, the J planes which are the upper surface of the housing are disposed such that the distances from the lower surface of the housing are sequentially increased, and the plurality of pin insertion holes is disposed such that at least one pin is inserted from each of the J planes which are the upper surface of the housing.

In other words, it can be said that the pin display device 500 of the fifth embodiment is a form in which the housings 110 of the plurality of pin display devices 100 are coupled such that the plurality of pin display devices 100 including the housings 110 having different heights of the upper surfaces 110*b* from the lower surfaces 110*a* and the pins 120 corresponding to the housings 110 are disposed such that the lower surfaces 110*a* of all the pin display devices 100 are on one plane perpendicular to the z direction, and the distance from the lower surface 110*a* to the upper surface 110*b* is sequentially increased.

Other Modifications and Like

Note that the present invention is not limited to the above-described embodiments, and it goes without saying that appropriate changes can be made without departing from the gist of the present invention.

The invention claimed is:

1. A pin display device comprising a housing and a plurality of pins, the pin display device being used as a pin display system such that a direction in which at least gravity acts is set as a negative direction of a z direction, and a lower surface of the housing is brought into contact with or into proximity to an upper surface that is one surface of a magnetic sheet, wherein the housing includes the lower surface of the housing that is a plane perpendicular to the z direction, an upper surface of the housing that is in a positive direction of the z direction with respect to the lower surface of the housing, and a same number of pin insertion holes as the pins, each of the pin insertion holes is a hole into which the pin is inserted from the upper surface of the housing, the same number of pin insertion holes as the pins have different positions in a plane perpendicular to the z direction, a material of the housing is a material that does not block or reduce a magnetic force line, does not control a path of a magnetic force line, and does not generate a magnetic force line, each of the pins is provided at one end with a pot magnet with an opening of a container facing outward, and is inserted into the pin insertion hole with the end provided with the pot magnet facing the negative direction of the z direction, each of the pot magnets emits a magnetic field capable of moving the pin including the pot magnet in the positive direction of the z direction by a repulsive force due to a magnetic force generated between the pot magnet and the upper surface of the magnetic sheet in a state where the pin including the pot magnet is inserted into the pin insertion hole, an interval between adjacent pin insertion holes is equal to or greater than a shortest distance at which a magnetic force generated with respect to the pot magnet of the pin inserted into the adjacent pin insertion hole does not affect movement of the pins, and a gap having a length in the z direction equal to or greater than a shortest distance in which at which rewriting of a magnetic sheet of a same type as the magnetic sheet does not occur due to a magnetic field emitted by a pot magnet that emits a same magnetic field as the pot magnet is provided between a bottom of the pin insertion hole and the lower surface of the housing.

2. The pin display device according to claim 1, wherein the upper surface of the housing is J planes corresponding to J (J is an integer of two or more) partial regions different from each other on the lower surface of the housing and moved by different distances in the positive direction of the z direction, the J planes that are the upper surface of the housing are disposed such that distances from the lower surface of the housing are sequentially increased, and a plurality of the pin insertion holes is disposed such that at least one of the pins is inserted from each of the J planes.

3. A pin display system comprising: the pin display device according to claim 1; and a magnetic sheet that uses one surface in contact with or in proximity to the lower surface of the housing of the pin display device, wherein a portion of the upper surface of the magnetic sheet facing the pot magnet of a pin to be moved in a positive direction of a z direction is magnetized with a magnetic pattern of a first portion of a same pole as a pole of a permanent magnet exposed from the opening of the container of the pot magnet, and a second portion that is a portion surrounding the first portion and is a pole opposite to the pole of the permanent magnet exposed from the opening of the container of the pot magnet, and a portion of the upper surface of the magnetic sheet facing the pole of the pot magnet of a pin not to be moved in the positive direction of the z direction is magnetized with a magnetic pattern that is not a magnetic pattern of a third portion of a same pole as the pole of the permanent magnet exposed from the opening of the container of the pot magnet, and a fourth portion that is a portion surrounding the third portion and is a pole opposite to the pole of the permanent magnet exposed from the opening of the container of the pot magnet.

4. A pin display system comprising: the pin display device according to claim 1; and a magnetic sheet that uses one surface in contact with or in proximity to the lower surface of the housing of the pin display device, wherein a portion of the upper surface of the magnetic sheet facing each of the pot magnets of a plurality of pins to be moved in a positive direction of a z direction is magnetized with a magnetic pattern of a first portion of a same pole as a pole of a permanent magnet exposed from the opening of the container of the pot magnet, and a second portion that surrounds the first portion and is a pole opposite to the pole of the permanent magnet exposed from the opening of the container of the pot magnet, and a magnetic pattern with which a portion facing the pot magnet of a pin a moving amount in the positive direction of the z direction of which is a first moving amount among a plurality of the pins to be moved in the positive direction of the z direction is magnetized, and a magnetic pattern with which a portion facing the pot magnet of the pin a moving amount in the positive direction of the z direction of which is a second moving amount different from the first moving amount among a plurality of the pins to be moved in the positive direction of the z direction is magnetized are different.

5. A pin display system comprising: the pin display device according to claim 1; and a magnetic sheet having one surface disposed in contact with or in proximity to the lower surface of the housing of the pin display device, wherein the upper surface of the magnetic sheet is larger in area than the lower surface of the housing of the pin display device, the upper surface of the magnetic sheet is magnetized in advance with a texture of an S pole and an N pole, and in a state where the lower surface of the housing of the pin display device and the upper surface of the magnetic sheet are brought into contact with or into proximity to each other, a relative position between the pin display device and the magnetic sheet can be changed in a direction perpendicular to a z direction.

6. A pin display system comprising: the pin display device according to claim 1; and a plurality of (K, K is an integer of two or more) magnetic sheets, wherein one surface of each of the K magnetic sheets is magnetized with a texture of an S pole and an N pole, any one of the K magnetic sheets is selectable, and a surface of one magnetic sheet selected from the K magnetic sheets that is magnetized with the texture is disposed in contact with or in proximity to the lower surface of the housing of the pin display device.

7. The pin display system according to claim 3, wherein the magnetic sheet is obtained by stacking a plurality of magnetic sheet materials, all magnetic sheet materials are magnetized in advance with a same texture of an S pole and an N pole, and the magnetic sheet is obtained such that same textures of all the magnetic sheet materials overlap at a same position.

8. The pin display system according to claim 3, wherein the magnetic sheet is obtained by stacking a plurality of magnetic sheet materials, and each magnetic sheet material is magnetized in advance with different textures of an S pole and an N pole.

* * * * *